United States Patent
Seo et al.

(10) Patent No.: US 11,270,612 B2
(45) Date of Patent: Mar. 8, 2022

(54) IMAGE DISPLAY APPARATUS

(71) Applicant: LG ELECTRONICS INC., Seoul (KR)

(72) Inventors: Ilho Seo, Seoul (KR); Kwangsoo Choi, Seoul (KR); Sukhyun Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 756 days.

(21) Appl. No.: 16/080,212

(22) PCT Filed: Aug. 25, 2017

(86) PCT No.: PCT/KR2017/009337
§ 371 (c)(1),
(2) Date: Aug. 27, 2018

(87) PCT Pub. No.: WO2019/039635
PCT Pub. Date: Feb. 28, 2019

(65) Prior Publication Data
US 2021/0192999 A1     Jun. 24, 2021

(51) Int. Cl.
*G09G 3/00*        (2006.01)
*G06F 3/0346*     (2013.01)
(Continued)

(52) U.S. Cl.
CPC .......... *G09G 3/035* (2020.08); *G06F 3/0346* (2013.01); *G06F 3/0482* (2013.01); *G09G 5/373* (2013.01); *G09G 5/38* (2013.01); *G09G 2354/00* (2013.01)

(58) Field of Classification Search
CPC ........ G09F 9/301; G06F 1/1652; G06F 9/542; G06F 3/011; H04M 1/724; H04M 1/725;
(Continued)

(56) References Cited

U.S. PATENT DOCUMENTS

| 10,142,577 B1 * | 11/2018 | Laird ............... H04N 21/42221 |
| 2006/0104017 A1 * | 5/2006 | Chang .................... G06F 1/1632 |
| | | 361/679.41 |

(Continued)

FOREIGN PATENT DOCUMENTS

| KR | 10-2010-0025709 | 3/2010 |
| KR | 10-2011-0048705 | 5/2011 |

(Continued)

OTHER PUBLICATIONS

International Search Report (with English Translation) and Written Opinion (with English Translation) dated May 16, 2018 issued in Application No. PCT/KR2017/009337.

*Primary Examiner* — Sahlu Okebato
(74) *Attorney, Agent, or Firm* — KED & Associates LLP

(57) ABSTRACT

An image display apparatus is disclosed. The image display apparatus includes a rollable display, a drive unit to change a size of the display, an external device interface unit including a plurality of external input terminals, and a controller to control the display, wherein, based on an external input display command, the controller controls the drive unit to roll down the display and controls a plurality of external input objects corresponding to the plurality of external input terminals to be displayed at positions corresponding to the plurality of external input.

18 Claims, 35 Drawing Sheets

(51) Int. Cl.
    *G06F 3/0482*     (2013.01)
    *G09G 5/373*     (2006.01)
    *G09G 5/38*     (2006.01)

(58) Field of Classification Search
    CPC .. H04M 1/0268; H04M 1/72454; G08B 21/24
    See application file for complete search history.

(56) References Cited

U.S. PATENT DOCUMENTS

| | | | |
|---|---|---|---|
| 2016/0029474 A1* | 1/2016 | Cho | H05K 5/0217 |
| | | | 361/749 |
| 2016/0320804 A1 | 11/2016 | Takayanagi et al. | |

FOREIGN PATENT DOCUMENTS

| | | | | |
|---|---|---|---|---|
| KR | 10-2011-0091409 | | 8/2011 | |
| KR | 10-2016-0013289 | | 2/2016 | |
| KR | 10-2016-0129669 | | 11/2016 | |
| KR | 20170095690 A | * | 8/2017 | ........... G06F 3/0346 |

* cited by examiner

IMAGE DISPLAY APPARATUS

CROSS-REFERENCE TO RELATED PATENT APPLICATIONS

This application is a U.S. National Stage Application under 35 U.S.C. § 371 of PCT Application No. PCT/KR2017/009337, filed Aug. 25, 2017, whose entire disclosure is hereby incorporated by reference.

BACKGROUND OF THE INVENTION

1. Field of the Invention

The present invention relates to an image display apparatus, and more particularly, to an image display apparatus capable of guiding an external device so as to be easily connected to an external input terminal disposed on the rear surface of the image display apparatus.

2. Description of the Related Art

An image display apparatus is an apparatus for outputting an image. The image display apparatus may output an image through a display panel or project an image to the outside using visible light or the like.

The size of the display of the image display apparatus is gradually increasing in accordance with the tendency of image display apparatuses to become larger and more sophisticated.

In addition, various external devices are connected to the image display apparatus, and thus images from the external devices are displayed on the image display apparatus.

For the image display apparatus, which is usually disposed in front of a wall, a connection terminal for an external device is disposed on the rear surface of the image display apparatus.

In this case, it is not easy for the user to find a corresponding external connection terminal and connect a new external device to the external connection terminal. Particularly, as the image display apparatus becomes larger, it becomes more difficult to connect a new external device.

SUMMARY OF THE INVENTION

Therefore, the present invention has been made in view of the above problems, and it is an object of the present invention to provide an image display apparatus capable of guiding an external device such that the external device may be easily connected to an external input terminal.

In accordance with an aspect of the present invention, the above and other objects can be accomplished by the provision of an image display apparatus including a rollable display, a drive unit to change a size of the display, an external device interface unit including a plurality of external input terminals, and a controller to control the display, wherein, based on an external input display command, the controller controls the drive unit to roll down the display and controls a plurality of external input objects corresponding to the plurality of external input terminals to be displayed at positions corresponding to the plurality of external input terminals within the rolled-down display.

In accordance with another aspect of the present invention, there is provided an image display apparatus including a rollable display, a drive unit to change a size of the display, an external device interface unit including a plurality of external input terminals, and a controller to control the display, wherein, when a first external input terminal is selected from among the plurality of external input terminals, the controller controls the drive unit to roll down the display, and controls a first external input object corresponding the first external input terminal to be displayed at a position corresponding to the first external input terminal within the rolled-down display.

In accordance with another aspect of the present invention, there is provided an image display apparatus including a rollable display, first and second drive units arranged at opposite side ends of the rollable display to change a size of the rollable display, a support disposed at a rear end of the display and arranged between the first and second drive units, a plurality of input terminals disposed on a rear surface of the support, and a controller to control the display, wherein the controller performs a control operation based on an external input display command to move at least one of the opposite side ends of the display toward the support during display of a predetermined image to reduce the size of the display, and controls a plurality of external input objects corresponding to the plurality of external input terminals to be displayed at positions corresponding to the plurality of external input terminals within the display having the reduced size.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1A:
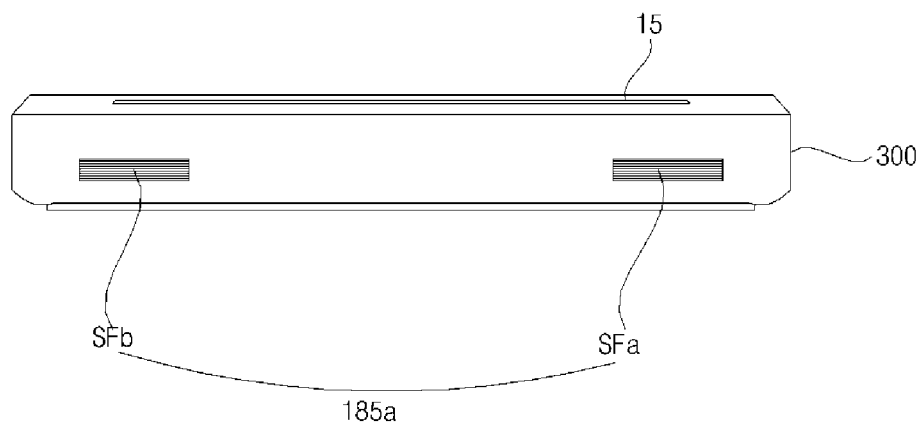
FIGS. 1A to 1D are views showing an image display apparatus having a rollable display according to an embodiment of the present invention.

Reference will now be made in detail to the preferred embodiments of the present invention, examples of which are illustrated in the accompanying drawings. Wherever possible, the same reference numbers will be used throughout the drawings to refer to the same or like parts.

As used herein, the suffixes "module" and "unit" are added simply to facilitate preparation of this specification and are not intended to suggest special meanings or functions. Therefore, the suffixes "module" and "unit" may be used interchangeably.

FIGS. 1A to 1D are views showing an image display apparatus having a rollable display according to an embodiment of the present invention.

Referring to FIGS. 1A to 1D, an image display apparatus 100 according to an embodiment of the present invention may include a display 180 and a signal processing device 300.

An opening 15 may be formed in the signal processing device 300 and the rollable display 180 may be rolled up through the opening 15 for display.

To this end, the signal processing device 300 may include a drive unit (175 in FIG. 2) for driving the rollable display 180. In this case, the drive unit (175 in FIG. 2) may include a roller (not shown) on which the rollable display 180 is wound and a motor (not shown) for rotating the roller.

First, FIG. 1A illustrates the rollable display 180 wound into the signal processing device 300 and not exposed to the outside of the opening 15.

At this time, the signal processing device 300 is in a stand-by mode, in which only some of the units may operate, and power may not be supplied to the display 180.

Figure 1B:
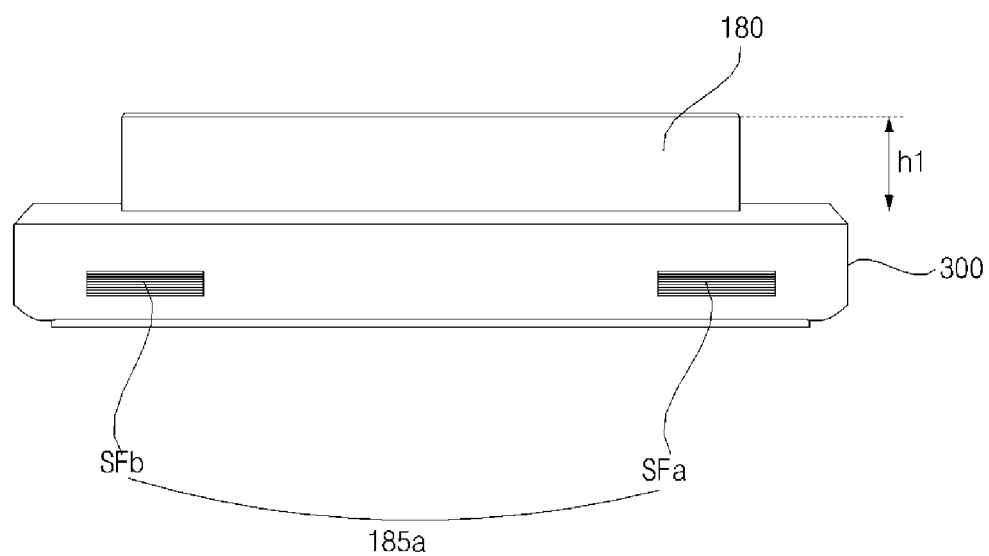

Next, FIG. 1B illustrates that the rollable display 180 is rolled up by the operation of the drive unit (175 in FIG. 2) such that the rollable display 180 has a height of h1 and is not exposed to the outside of the opening 15.

Figure 1C:
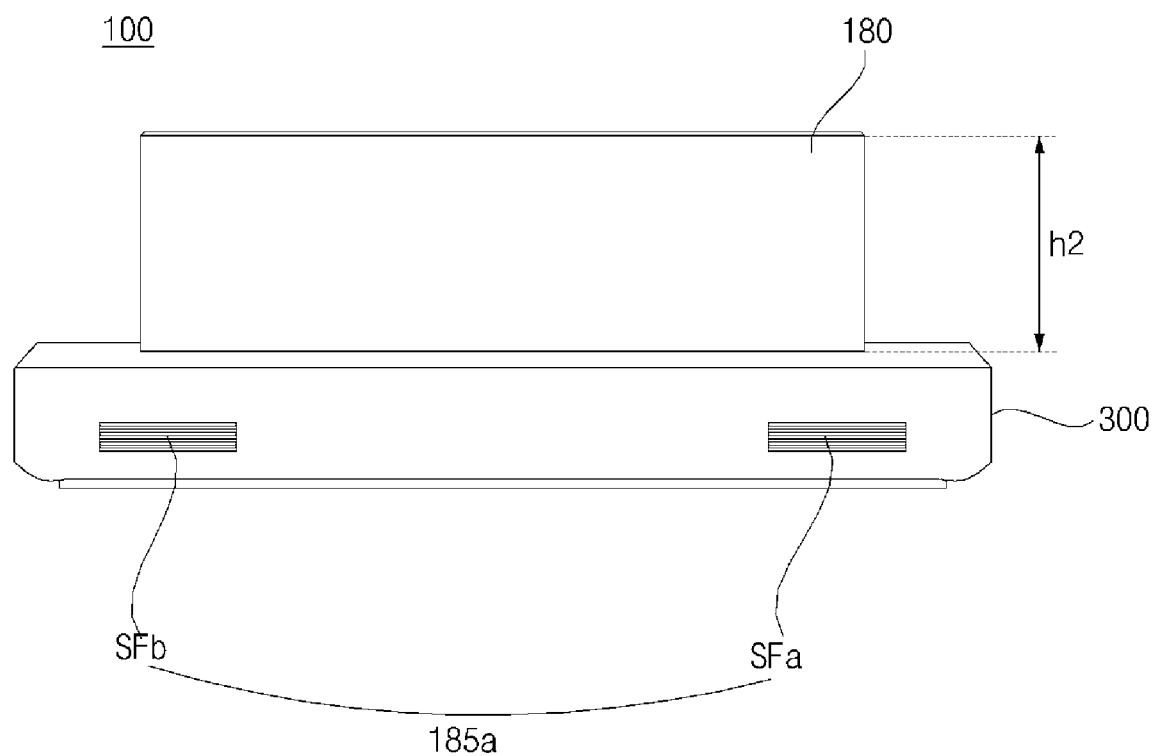

Next, FIG. 1C illustrates that the rollable display 180 is rolled up by the operation of the drive unit (175 in FIG. 2) such that the height of the rollable display 180 is h2.

Figure 1D:
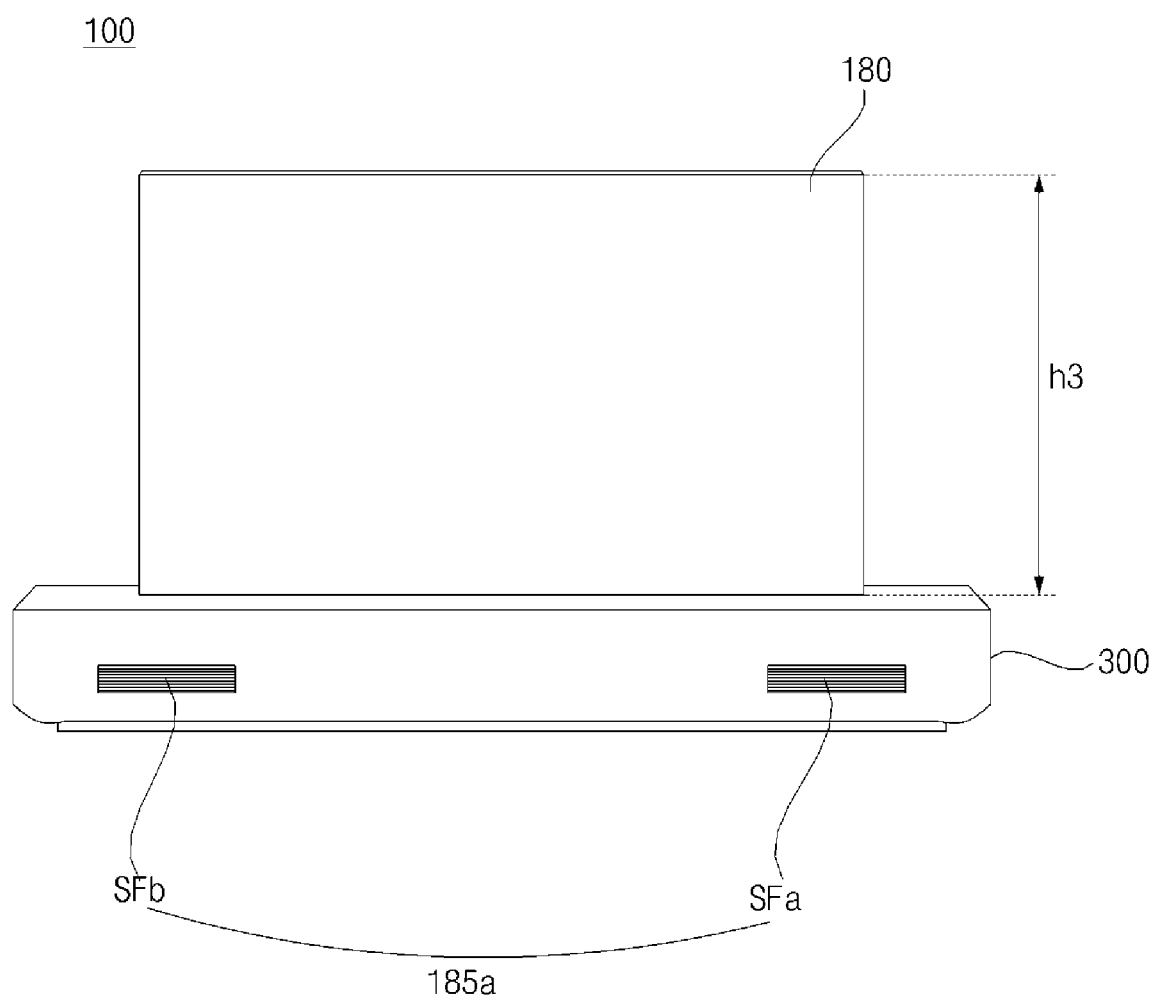

Next, FIG. 1D illustrates that the rollable display 180 is rolled up by the operation of the drive unit (175 in FIG. 2) such that the height of the rollable display 180 is h3.

The image display apparatus 100 according to an embodiment of the present invention includes a rollable display 180, a drive unit 175 for changing the size of the display 180, an external device interface unit 130 having a plurality of external input terminals, and a controller 170 for controlling the display 180. Based on an external input display command, the controller 170 controls the drive unit 175 to roll down the display 180 and controls a plurality of external input objects corresponding to the plurality of external input terminals to be displayed at positions corresponding to the plurality of external input terminals within the rolled-down display 180. Accordingly, an external device may be guided so as to be easily connected to an external input terminal disposed on the rear surface of the image display apparatus.

In particular, since the plurality of external input objects corresponding to the plurality of external input terminals is displayed, the user can immediately identify the position of an external input terminal to be connected. Further, since the height of the rollable display 180 is reduced, an external device to be connected may be easily guided so as to be connected to an external connection terminal. Therefore, user convenience may be enhanced.

According to another embodiment of the present invention, the image display apparatus 100 includes a rollable display 180, a drive unit 175 for changing a size of the display 180, an external device interface unit 130 having a plurality of external input terminals, and a controller 170 for controlling the display 180. When a first external input terminal is selected from among the plurality of external input terminals, the controller 170 controls the drive unit 175 to roll down the display 180, and controls a first external input object corresponding to the first external input terminal to be displayed at a position corresponding to the first external input terminal within the rolled-down display 180. Accordingly, an external device may be guided so as to be easily connected to an external input terminal disposed on the rear surface of the image display apparatus.

In particular, by displaying the first external input object corresponding to the selected first external input terminal, the user may immediately identify the position of the external input terminal to be connected. Further, since the height of the rollable display 180 is reduced, an external terminal to be connected may be easily guided so as to be connected to an external connection terminal. Therefore, user convenience may be enhanced.

Meanwhile, the rollable display 180 may be a flexible display, and include an organic light emitting diode (OLED) panel.

The OLED panel may include a plurality of scan lines and a plurality of data lines, and pixels each including a subpixel may be defined at the intersection between each scan line and each data line.

The pixel circuit of the OLED panel may include a switching transistor SW1, a storage capacitor Cst, a driving transistor SW2, and an organic light emitting diode (OLED) layer.

The switching transistor SW1 has a gate terminal connected with a scan line and turned on according to an input scan signal Vdscan. When turned on, the switching transistor SW1 transmits an input data signal Vdata to the gate terminal of the driving transistor SW2 or one end of the storage capacitor Cst.

The storage capacitor Cst is formed between the gate terminal and the source terminal of the driving transistor SW2 and stores a predetermined difference between the level of the data signal transmitted to one end of the storage capacitor Cst and the level of DC power VDD transmitted to the other end of the storage capacitor Cst.

For example, when the data signals have different levels according to the pulse amplitude modulation (PAM) scheme, the power level to be stored in the storage capacitor Cst depends on the level difference of the data signal Vdata.

As another example, when the data signals have different pulse widths according to the pulse width modulation (PWM) scheme, the power level to be stored in the storage capacitor Cst depends on the pulse width difference of the data signal Vdata.

The driving transistor SW2 is turned on according to the level of power stored in the storage capacitor Cst. When the driving transistor SW2 is turned on, the driving current IOLED, which is proportional to the level of stored power, flows to the OLED layer. Accordingly, the OLED layer performs the light emitting operation.

The OLED layer may include a light emitting layer (EML) of RGBW corresponding to a subpixel. The OLED layer may include at least one of a hole injection layer (HIL), a hole transport layer (HTL), an electron transport layer (ETL), and an electron injection layer (EIL) and may also include a hole blocking layer.

In the OLED layer, all subpixels emit white light. In the case of green, red, and blue subpixels, however, a separate color filter is provided to implement colors. That is, when the green, red, and blue subpixels are provided, green, red, and blue color filters are further provided. For the white subpixel, since white light is output, a separate color filter is not required.

The signal processing device 300 may include a speaker unit 185a capable of outputting sound in a front direction.

In the figure, it is illustrated that speakers SFa and SFb belonging to the speaker unit 185a are arranged in the front direction of the signal processing device 300.

Accordingly, the sound output from the speaker unit 185*a* is emitted toward the user, and reaches the user.

The image display apparatus 100 of FIGS. 1A to 1D may be a monitor, a TV, a tablet PC, a mobile terminal, or the like.

Figure 2:
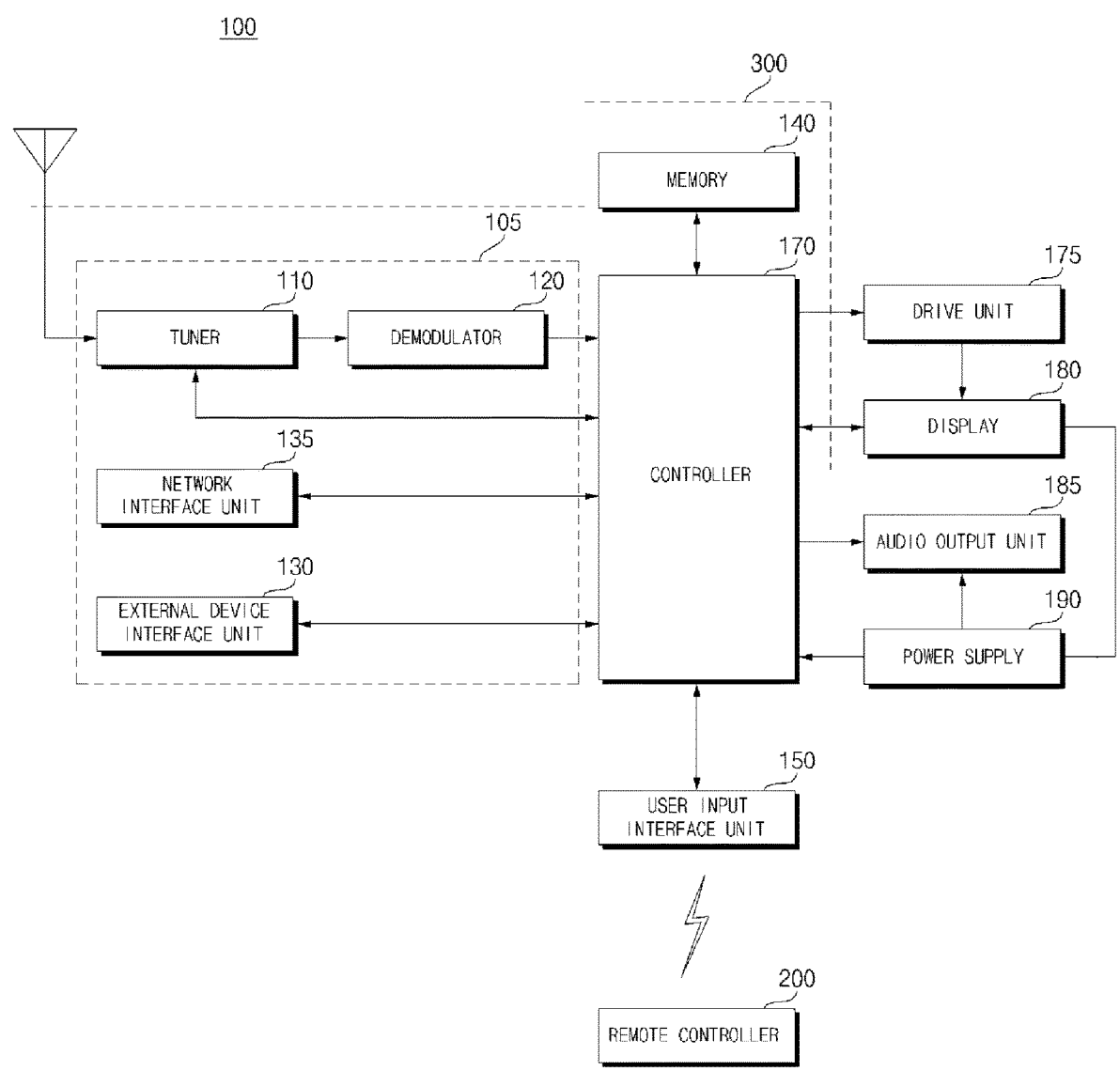
FIG. 2 is an internal block diagram of the image display apparatus of FIGS. 1A to 1D.

FIG. 2 is an internal block diagram of the image display apparatus of FIGS. 1A to 1D.

Referring to FIG. 2, the image display apparatus 100 according to an embodiment of the present invention may include a display 180 and a signal processing device 300.

The signal processing device 300 includes a tuner 110, a demodulator 120, an external device interface unit 130, a network interface unit 135, a memory 140, a user input interface unit 150, a sensor unit (not shown), a controller 170, an audio output unit 185, and a drive unit 175.

While it is illustrated in the figure that the tuner 110, the demodulator 120, the external device interface unit 130, and the network interface unit 135 are provided in a broadcast receiver 105, various variations can be made.

The tuner 110 selects a radio frequency (RF) broadcast signal corresponding to a channel selected by the user or all pre-stored channels among RF broadcast signals received through the antenna 50. In addition, the tuner 110 converts the selected RF broadcast signal into an intermediate frequency signal, a baseband image, or a voice signal.

For example, if the selected RF broadcast signal is a digital broadcast signal, the signal is converted into a digital IF signal (DIF). If the selected RF broadcast signal is an analog broadcast signal, the signal is converted into an analog baseband image or voice signal (CVBS/SIF). That is, the tuner 110 may process a digital broadcast signal or an analog broadcast signal. The analog baseband image or voice signal (CVBS/SIF) output from the tuner 110 may be directly input to the controller 170.

Meanwhile, in the present invention, the tuner 110 may sequentially select RF broadcast signals of all broadcast channels stored by a channel memorization function among the RF broadcast signals received through the antenna, and convert the same into intermediate frequency signals, baseband images, or voice signals.

To receive broadcast signals of a plurality of channels, a plurality of tuners 110 may be provided. Alternatively, a single tuner to receive a plurality of channels simultaneously may be provided.

The demodulator 120 receives the digital IF signal DIF converted by the tuner 110 and performs a demodulation operation.

After performing demodulation and channel decoding, the demodulator 120 may output a stream signal TS. Herein, the stream signal may be a signal obtained by multiplexing an image signal, voice signal or data signal.

The stream signal output from the demodulator 120 may be input to the controller 170. After performing demultiplexing and image/voice signal processing, the controller 170 outputs an image to the display 180 and a voice to the audio output unit 185.

The external device interface unit 130 may transmit or receive data to or from a connected external device 190. To this end, the external device interface unit 130 may include an A/V input/output unit (not shown) or a wireless communication unit.

The external device interface unit 130 may be connected to external devices such as a DVD (digital versatile disc) player, a Blu-ray player, a gaming device, a camera, a camcorder, a computer (laptop), and a set-top box in a wired/wireless manner, and perform input/output operations with external devices.

The A/V input/output unit may receive image and voice signals input from an external device. Meanwhile, the wireless communication unit may perform short-range wireless communication with other electronic devices.

The network interface unit 135 provides an interface for connection with a wired/wireless network including the Internet. For example, the network interface unit 135 may receive content or data provided by a content provider or a network operator over a network.

The memory 140 may store programs for processing and control of signals in the controller 170, and also store a signal-processed image, voice signal or data signal.

The memory 140 may also function to temporarily store an image signal, a voice signal or a data signal input through the external device interface unit 130. In addition, the memory 140 may store information about a predetermined broadcast channel through the channel memorization function such as a channel map.

While it is illustrated in FIG. 2 that the memory 140 is provided separately from the controller 170, embodiments of the present invention are not limited thereto. The memory 140 may be provided in the controller 170.

The user input interface unit 150 may transmit a signal input by the user to the controller 170 or transmit a signal from the controller 170 to the user.

For example, the user input interface unit 150 may transmit/receive user input signals such as power on/off, channel selection, and screen window setting to/from the remote controller 200, deliver, to the controller 170, user input signals input through local keys (not shown) such as a power key, a channel key, a volume key, or a setting key, deliver, to the controller 170, user input signals input through a sensor unit (not shown) configured to sense user gestures, or transmit a signal from the controller 170 to the sensor unit (not shown).

The control unit 170 may demultiplex the input stream or process the demultiplexed signals through the tuner 110, the demodulator 120, or the external device interface unit 130 to generate and output a signal for outputting an image or sound.

An image signal image-processed by the controller 170 may be input to the display 180 and an image corresponding to the image signal may be displayed. In addition, the image signal which is image-processed by the controller 170 may be input to an external output device through the external device interface unit 130.

A voice signal processed by the controller 170 may be output to the audio output unit 185 in the form of sound. In addition, the voice signal processed by the controller 170 may be input to an external output device through the external device interface unit 130.

Although not shown in FIG. 2, the controller 170 may include a demultiplexer and an image processor, which will be described with reference to FIG. 3 later.

Additionally, the controller 170 may control overall operation of the image display apparatus 100. For example, the controller 170 may control the tuner 110 to tune to an RF broadcast corresponding to a channel selected by the user or a pre-stored channel.

The controller 170 may control the image display apparatus 100 according to a user command input through the user input interface unit 150 or an internal program.

The controller 170 may control the display 180 to display an image. Herein, the image displayed on the display 180 may be a still image, a moving image, a 2D image, or a 3D image.

The controller 170 may perform a control operation to generate a 3D object from a predetermined 2D object in an image displayed on the display 180 and display the same. For example, the object may be at least one of an accessed web page (a newspaper, a magazine, etc.), an EPG (electronic program guide), various menus, a widget, an icon, a still image, a moving image and text.

The controller 170 may recognize the position of the user based on the image captured by an image capture unit (not shown). For example, the distance (z-axis coordinate) between the user and the image display apparatus 100 may be identified. The x-axis coordinate and the y-axis coordinate in the display 180 corresponding to the user position may also be identified.

Although not shown in the figure, a channel browsing processor for creating a thumbnail image corresponding to a channel signal or an external input signal may be further provided. The channel browsing processor may receive a stream signal TS output from the demodulator 120 or a stream signal output from the external device interface unit 130 and extract an image from the input stream signal to create a thumbnail image. The created thumbnail image may be stream-decoded together with a decoded image and input to the controller 170. The controller 170 may display a thumbnail list including a plurality of thumbnail images on the display 180 using the input thumbnail image.

The thumbnail list may be displayed in a simple view mode in which the thumbnail list is displayed on a part of the display 180 with a predetermined image displayed on the display 180, or may be displayed in a full view mode in which the thumbnail list is displayed in most of the area of the display 180. The thumbnail images in the thumbnail list may be sequentially updated.

The drive unit 175 may include a roller (not shown) on which the rollable display 180 is wound and a motor (not shown) for rotating the roller. The rollable display 180 may be rolled up or down by the drive unit 175.

The display 180 generates drive signals by converting an image signal, data signal, OSD signal, and control signal processed by the controller 170 or an image signal, data signal and control signal received from the external device interface unit 130.

The display 180 includes an organic light emitting panel and is flexible or rollable.

The display 180 may be configured by a touchscreen and may thus be used not only as an output device but also as an input device.

The audio output unit 185 receives a voice signal processed by the controller 170 and outputs voice.

The audio output unit 185 may include a speaker unit 185a as described above.

The capture unit (not shown) captures an image of the user. The capture unit (not shown) may be implemented using one camera. However, embodiments of the present invention are not limited thereto. The capture unit (not shown) may be implemented using a plurality of cameras. The capture unit (not shown) may be buried in the upper portion of the display 180 of the image display apparatus or may be separately disposed. Image information captured by the capture unit (not shown) may be input to the controller 170.

The controller 170 may sense gesture of the user based on an image captured by the capture unit (not shown), a sensed signal from the sensor unit (not shown), or a combination thereof.

The power supply 190 supplies power to all parts of the image display apparatus 100. In particular, the power supply 190 may supply power to the controller 170, which may be implemented in the form of a system on chip (SOC), the display 180 for display of images, and the audio output unit 185 for outputting audio signals.

Specifically, the power supply 190 may include a converter to convert alternating current (AC) power into direct current (DC) power and a DC-DC converter to change the level of the DC power.

The remote controller 200 transmits a user input to the user input interface unit 150. To this end, the remote controller 200 may employ Bluetooth, radio frequency (RF) communication, infrared (IR) communication, ultra-wide-band (UWB), or ZigBee. In addition, the remote controller 200 may receive an image signal, a voice signal or a data signal from the user input interface unit 150, and display or output the same.

The image display apparatus 100 may be a fixed or mobile digital broadcast receiver capable of receiving digital broadcast services.

The block diagram of the image display apparatus 100 shown in FIG. 2 is simply illustrative. Constituents of the block diagram may be integrated, added or omitted according to the specifications of the image display apparatus 100 which is implemented in reality. That is, two or more constituents may be combined into one constituent, or one constituent may be subdivided into two or more constituents, when necessary. In addition, the function performed by each block is simply illustrative, and it should be noted that specific operations or devices of the blocks do not limit the scope of the present invention.

Unlike the example shown in FIG. 2, the video display apparatus 100 may not include the tuner 110 and the demodulator 120 shown in FIG. 2, but may receive and reproduce image content through the network interface unit 135 or an external device interface unit 130.

The image display apparatus 100 is an example of an image signal processing device that performs signal processing on an image stored in the apparatus or an input image. Other examples of the image signal processing device may include a set-top box without the display 180 and the audio output unit 185 shown in FIG. 2, a DVD player, a Blu-ray player, a gaming device, or a computer.

Figure 3:
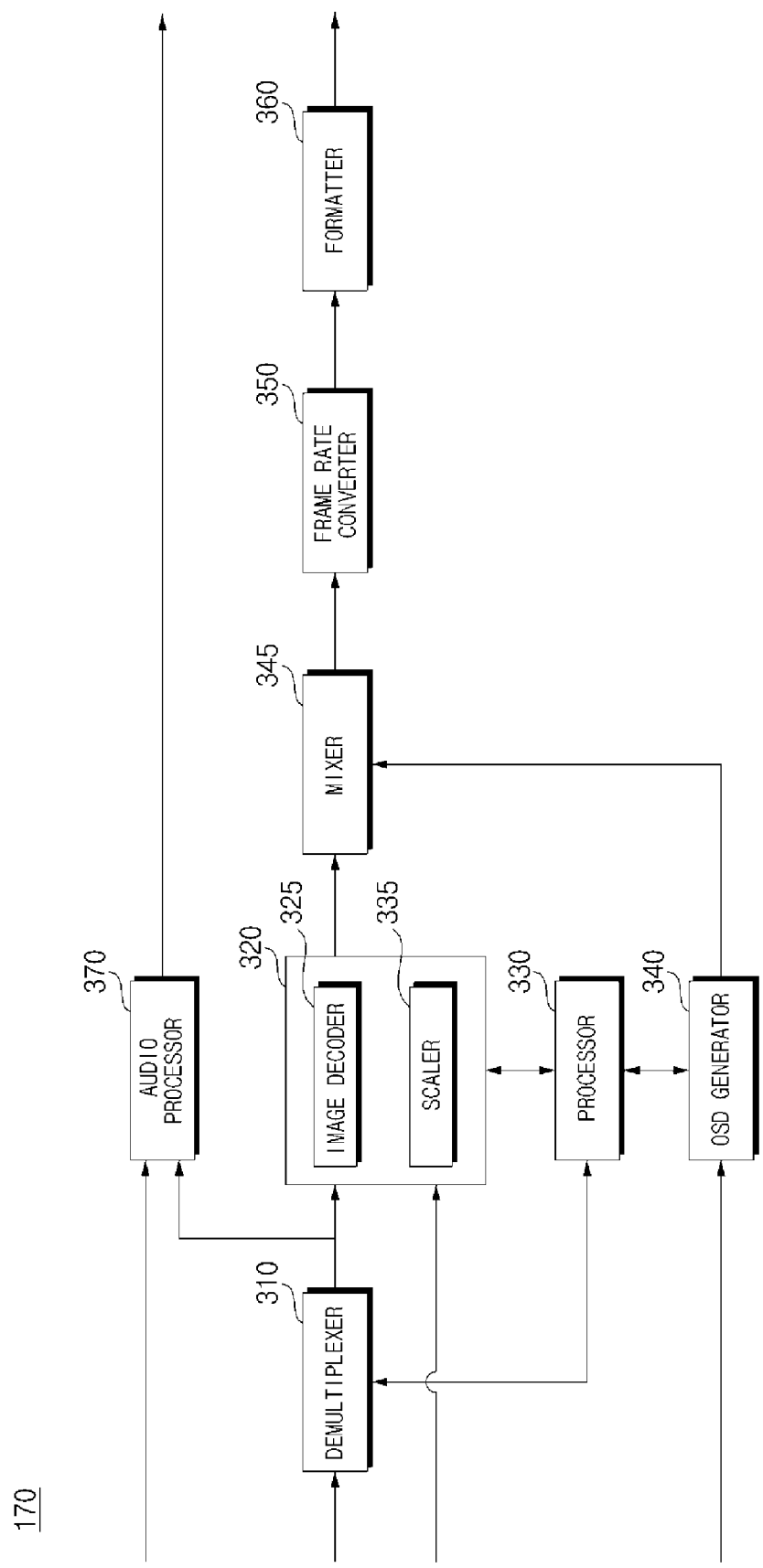
FIG. 3 is an internal block diagram of the controller of FIG. 2.

FIG. 3 is an internal block diagram of the controller of FIG. 2.

Referring to FIG. 3, the controller 170 according to an embodiment of the present invention may include a demultiplexer 310, an image processor 320, a processor 330, an OSD generator 340, a mixer 345, a frame rate converter 350, and a formatter 360. The controller 170 may further include an audio processor (not shown) and a data processor (not shown).

The demultiplexer 310 demultiplexes an input stream. For example, when an MPEG-2 TS is input, the demultiplexer 310 may demultiplex the same to separate the stream into an image signal, a voice signal and a data signal. Herein, the stream signal input to the demultiplexer 310 may be a stream signal output from the tuner 110, the demodulator 120 or the external device interface unit 130.

The image processor 320 may perform image processing on the demultiplexed image signal. To this end, the image processor 320 may include an image decoder 325 and a scaler 335.

The image decoder 325 decodes the demultiplexed image signal, and the scaler 335 scales the resolution of the decoded image signal such that the image signal can be output through the display 180.

The image decoder 325 may include decoders of various standards.

The processor 330 may control overall operations of the image display apparatus 100 or the controller 170. For example, the processor 330 may control the tuner 110 to tune to an RF broadcast corresponding to a channel selected by the user or a pre-stored channel.

In addition, the processor 330 may control the image display apparatus 100 according to a user command input through the user input interface unit 150 or an internal program.

The processor 330 may control data transmission with the network interface unit 135 or the external device interface unit 130.

The processor 330 may control operations of the demultiplexer 310, the image processor 320 and the OSD generator 340, which are provided in the controller 170.

The OSD generator 340 generates an OSD signal automatically or according to user input. For example, the OSD generator 340 may generate, based on a user input signal, a signal for displaying various kinds of information in the form of images or text on the screen of the display 180. The generated OSD signal may contain various data including the user interface screen window of the image display apparatus 100, various menu screens, widgets, and icons.

The OSD generator 340 may generate a pointer which can be displayed on the display, based on a pointing signal input via the remote controller 200. In particular, the pointer may be generated by a pointing signal processor (not shown), and the OSD generator 340 may include the pointing signal processor. Of course, it is possible to provide the pointing signal processor (not shown) separately from the OSD generator 340.

The mixer 345 may mix the OSD signal generated by the OSD generator 340 and the decoded image signal image-processed by the image processor 320.

The FRC 350 may convert the frame rate of an input image. The frame rate converter 350 can output frames without performing frame rate conversion.

The formatter 360 may convert the input signal into an image signal to be transmitted to the display 180. For example, it may convert the input signal into a low voltage differential signal (LVDS) or mini-LVDS.

The audio processor 370 in the controller 170 may process the demultiplexed audio signal or an audio signal of predetermined content. To this end, the audio processor 370 may include various decoders.

The audio processor 370 in the controller 170 may perform processing such as adjustment of bass, treble, and volume.

The data processor (not shown) in the controller 170 may perform data processing on a demultiplexed data signal. For example, if the demultiplexed data signal is a coded data signal, the data processor (not shown) may decode the data signal. The coded data signal may be electronic program guide (EPG) information containing broadcast information such as a start time and end time of a broadcast program broadcast on each channel.

The block diagram of the controller 170 shown in FIG. 3 is simply illustrative. Constituents of the block diagram may be integrated, added or omitted according to the specifications of the controller 170 that is implemented in reality.

In particular, the FRC 350 and the formatter 360 may not be provided in the controller 170. Instead, they may be provided individually or as one separate module.

Figure 4:
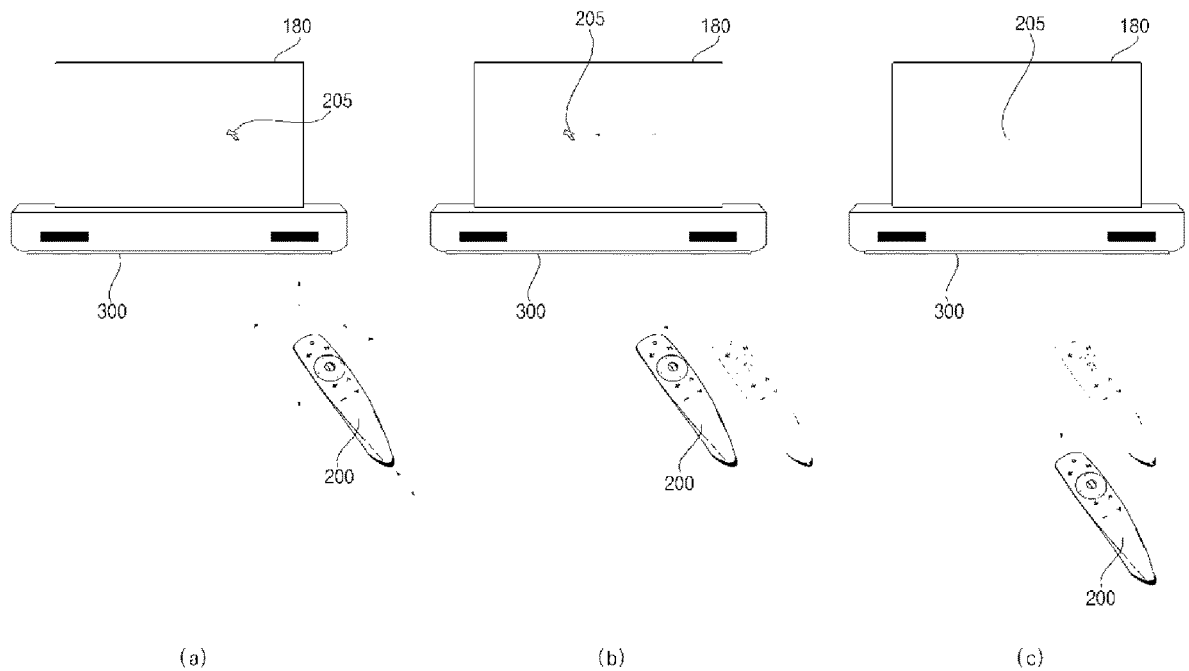
FIG. 4 illustrates a control method of the remote controller of FIG. 2.

FIG. 4 illustrates a control method of the remote controller of FIG. 2.

As shown in FIG. 4(a), a pointer 205 corresponding to the remote controller 200 may be displayed on the display 180.

The user may move the remote controller 200 up and down, left and right (FIG. 4(b)), or back and forth (FIG. 4(c)) or rotate the same. The pointer 205 displayed on the display 180 of the image display apparatus corresponds to movement of the remote controller 200. As shown in the figure, since the pointer 205 moves according to movement of the remote controller 200 in 3D space, the remote controller 200 may be referred to as a spatial remote controller or a 3D pointing device.

FIG. 4(b) illustrates a case where the pointer 205 displayed on the display 180 of the image display apparatus moves to the left when the user moves the remote controller 200 to the left.

Information about movement of the remote controller 200 sensed through a sensor of the remote controller 200 is transmitted to the image display apparatus. The image display apparatus may calculate coordinates of the pointer 205 based on the information about the movement of the remote controller 200. The image display apparatus may provide the pointer 205 such that the pointer 205 corresponds to the calculated coordinates.

FIG. 4(c) illustrates a case where the user moves the remote controller 200 away from the display 180 while pressing down a specific button on the remote controller 200. In this case, a selected area of the display 180 corresponding to the pointer 205 may be zoomed in and displayed with the size thereof increased. On the other hand, when the user moves the remote controller 200 closer to the display 180, the selected area may be zoomed out and displayed with the size thereof reduced. Alternatively, the selected area may be zoomed out when the remote controller 200 moves away from the display 180, and may be zoomed in when the remote controller 200 moves closer to the display 180.

Vertical and lateral movement of the remote controller 200 may not be recognized while the specific button on the remote controller 200 is pressed down. That is, when the remote controller 200 approaches or moves away from the display 180, vertical and lateral movement thereof may not be recognized and only back-and-forth movement thereof may be recognized. If the specific button in the remote controller 200 is not pressed down, only the pointer 205 moves according to vertical and lateral movement of the remote controller 200.

The speed and direction of movement of the pointer 205 may correspond to the speed and direction of movement of the remote controller 200.

Figure 5:
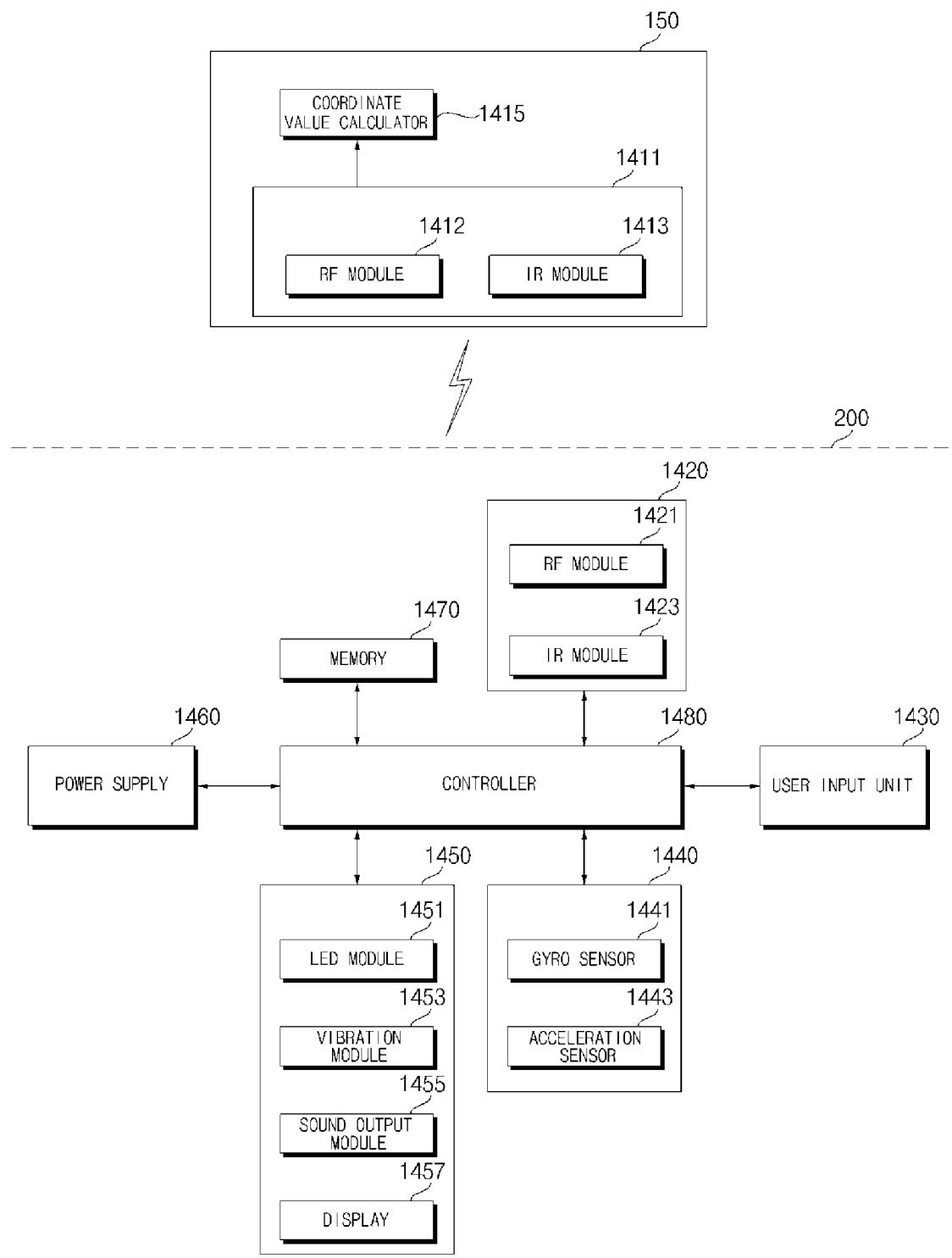
FIG. 5 is an internal block diagram of the remote controller of FIG. 2.

FIG. 5 is an internal block diagram of the remote controller of FIG. 2.

Referring to FIG. 5, the remote controller 200 may include a wireless communication unit 1425, a user input unit 1435, a sensor unit 1440, an output unit 1450, a power supply 1460, a memory 1470, and a controller 1480.

The wireless communication unit 1425 transmits/receives signals to/from any one of the image display apparatuses according to the embodiments of the present invention described above. Of the image display apparatuses according to the embodiments of the present invention, one image display apparatus 100 will be described as an example.

In this embodiment, the remote controller 200 may include an RF module 1421 capable of transmitting and receiving signals to and from the image display apparatus 100 according to an RF communication standard. The remote controller 200 may further include an IR module

1423 capable of transmitting and receiving signals to and from the image display apparatus 100 according to an IR communication standard.

In this embodiment, the remote controller 200 may transmit a signal containing information about movement of the remote controller 200 and the like to the image display apparatus 100 via the RF module 1421.

In addition, the remote controller 200 may receive a signal from the image display apparatus 100 via the RF module 1421. When necessary, the remote controller 200 may transmit commands related to power on/off, channel change, and volume change to the image display apparatus 100 via the IR module 1423.

The user input unit 1435 may include a keypad, a button, a touchpad, or a touchscreen. The user may input a command related to the image display apparatus 100 by manipulating the user input unit 1435. If the user input unit 1435 includes a hard key, the user may input, to the remote controller 200, a command related to the image display apparatus 100 by pressing the hard key. If the user input unit 1435 includes a touchscreen, the user may input, to the remote controller 200, a command related to the image display apparatus 100 by touching a soft key on the touchscreen. The user input unit 1435 may include various kinds of input means such as a scroll wheel and a jog wheel, but it should be noted that this embodiment does not limit the scope of the present invention.

The sensor unit 1440 may include a gyro sensor 1441 or an acceleration sensor 1443. The gyro sensor 1441 may sense information about movement of the remote controller 200.

For example, the gyro sensor 1441 may sense information about movement of the remote controller 200 with respect to the X, Y and Z axes. The acceleration sensor 1443 may sense information about the movement speed of the remote controller 200. The sensor unit 1440 may further include a distance measurement sensor to sense a distance to the display 180.

The output unit 1450 may output an image signal or voice signal corresponding to manipulation of the user input unit 1435 or a signal transmitted from the image display apparatus 100. The user may recognize, via the output unit 1450, whether the user input unit 1435 is manipulated or the image display apparatus 100 is controlled.

For example, the output unit 1450 may include an LED module 1451 configured to be turned on when signals are transmitted to and received from the image display apparatus 100 via the wireless communication unit 1425, a vibration module 453 configured to generate vibration, a sound output module 1455 configured to output sound, or a display 1457 configured to output an image.

The power supply 1460 supplies power to the remote controller 200. If the remote controller 200 does not move for a predetermined time, the power supply 1460 may stop supplying power to save power. The power supply 1460 may resume supply of power when the predetermined key provided to the remote controller 200 is manipulated.

The memory 1470 may store various kinds of programs and application data necessary for control or operation of the remote controller 200. When the remote controller 200 wirelessly transmits and receives signals to and from the image display apparatus 100 via the RF module 1421, the remote controller 200 and the image display apparatus 100 may transmit and receive signals in a predetermined frequency band. The controller 1480 of the remote controller 200 may store, in the memory 1470, information about, for example, a frequency band enabling wireless transmission and reception of signals to and from the image display apparatus 100, which is paired with the remote controller 200, and reference the same.

The controller 1480 controls operations related to control of the remote controller 200. The controller 1480 may transmit, via the wireless communication unit 1425, a signal corresponding to manipulation of a predetermined key of the user input unit 1435 or a signal corresponding to movement of the remote controller 200 sensed by the sensor unit 1440 to the image display apparatus 100.

The user input interface unit 150 of the image display apparatus 100 may include a wireless communication unit 151 capable of wirelessly transmitting and receiving signals to and from the remote controller and a coordinate calculator 1415 capable of calculating coordinates of the pointer corresponding to operation of the remote controller 200.

The user input interface unit 150 may wirelessly transmit and receive signals to and from the remote controller 200 via an RF module 1412. In addition, the user input interface unit 150 may receive, via an IR module 1413, a signal transmitted from the remote controller 200 according to an IR communication standard.

The coordinate calculator 1415 may calculate coordinates (x, y) of the pointer 202 to be displayed on the display 180, by correcting the unstable position of a hand or an error in a signal corresponding to operation of the remote controller 200 which is received via the wireless communication unit 151.

The transmitted signal of the remote controller 200 input to the image display apparatus 100 via the user input interface unit 150 is transmitted to the controller 180 of the image display apparatus 100. The controller 180 may determine information about an operation of the remote controller 200 or manipulation of a key from the signal transmitted from the remote controller 200, and control the image display apparatus 100 according to the information.

As another example, the remote controller 200 may calculate coordinates of the pointer corresponding to movement thereof and output the same to the user input interface unit 150 of the image display apparatus 100. In this case, the user input interface unit 150 of the image display apparatus 100 may transmit, to the controller 180, information about the received coordinates of the pointer without separately correcting the unstable position of the hand or error.

As another example, in contrast with the example of the figure, the coordinate calculator 1415 may be provided in the controller 170 rather than in the user input interface unit 150.

Figure 6:
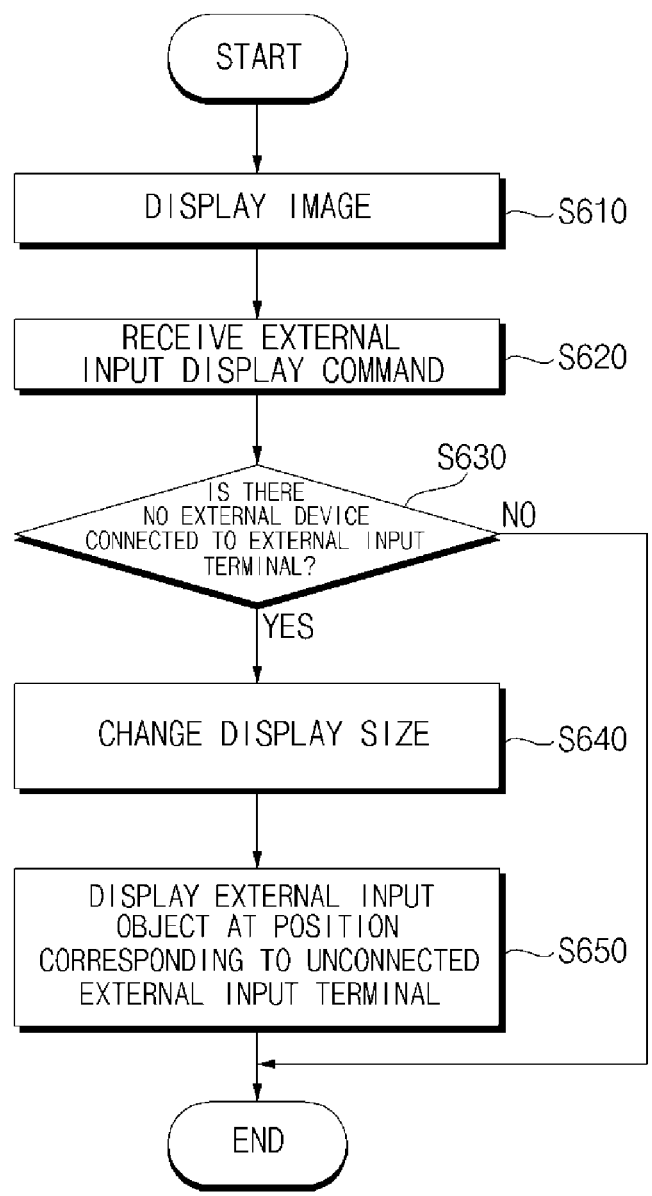
FIG. 6 is a flowchart illustrating an operation method of an image display apparatus having a rollable display according to an embodiment of the present invention.

FIG. 6 is a flowchart illustrating an operation method of an image display apparatus having a rollable display according to an embodiment of the present invention, and FIGS. 7A to 11C are views referred to in the description of the operation method of FIG. 6.

First, referring to FIG. 6, if there is no separate input after power-on input is provided, the controller 170 of the image display apparatus 100 may operate in a standby mode, in which only a part of the units in the signal processing device 300 may operate and power may not be supplied to the display 180.

For example, the controller 170 of the image display apparatus 100 may be in the standby mode and control power to be supplied only to the user input interface unit 150. Alternatively, the controller 170 may control power to be further supplied to the network interface unit 135 and the external device interface unit 130.

In the standby mode, as shown in FIG. 1A, the rollable display 180 may be wound in the signal processing device 300 so as not to be exposed to the outside.

Figure 7A:
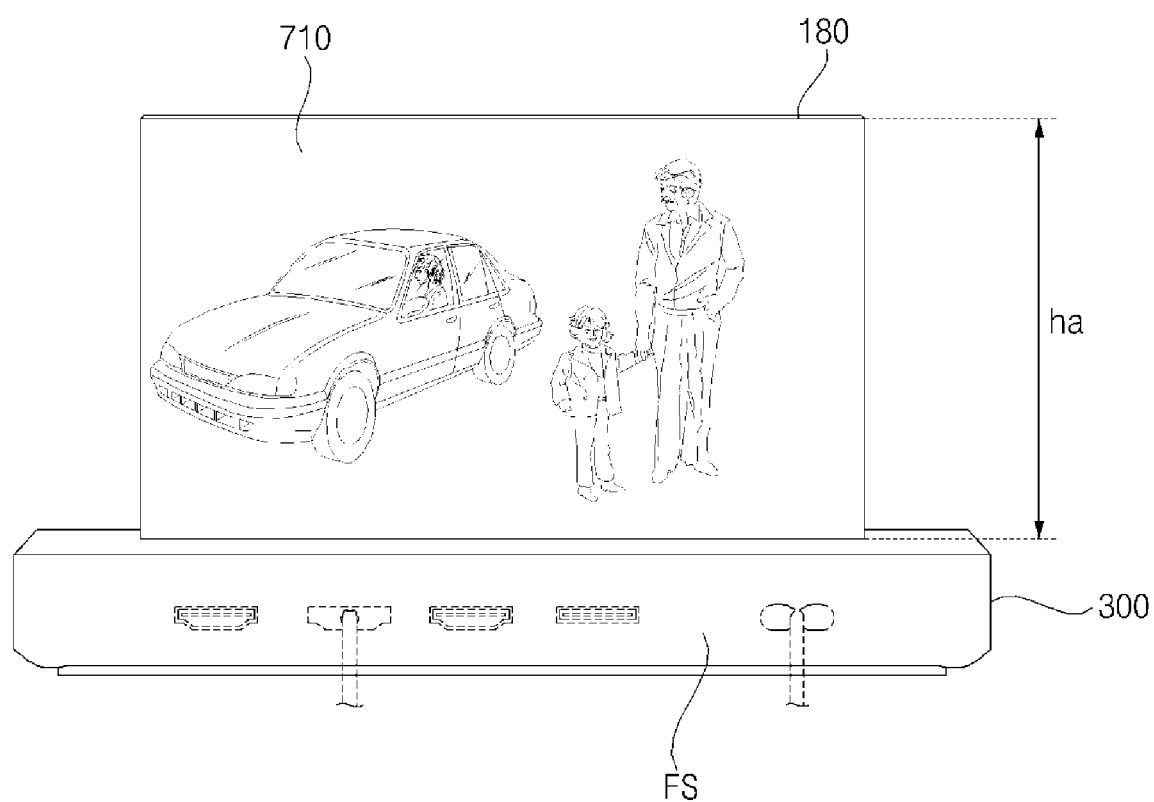
FIGS. 7A to 11C are views referred to in the description of the operation method of FIG. 6.

Next, in accordance with the image display input, the controller 170 of the image display apparatus 100 may perform a control operation according to an image display input to roll up the rollable display 180 such that the height of the rollable display 180 becomes ha, as shown in FIG. 7A.

Next, the controller 170 of the image display apparatus 100 may perform a control operation according to the image display input to display a predetermined image 710 on the rollable display 180 having the height of ha (S610).

Here, the predetermined image 710 may be a broadcast image, an external input image, or the like.

FIG. 7A is a view showing the front surface of the image display apparatus 100, in particular, the front surface of the display 180. In this example, a plurality of external input terminals and a power terminal are disposed on the rear surface of the signal processing device 300.

In particular, FIG. 7A illustrates that an HDMI1 terminal, an HDMI2 terminal, an HDMI3 terminal, a USB terminal, and a power terminal are arranged on the rear surface of the signal processing device 300 from left to right.

The HDMI1 terminal, the HDMI2 terminal, the HDMI3 terminal, and the USB terminal may be provided in the external device interface unit 130 of FIG. 2.

Figure 7B:
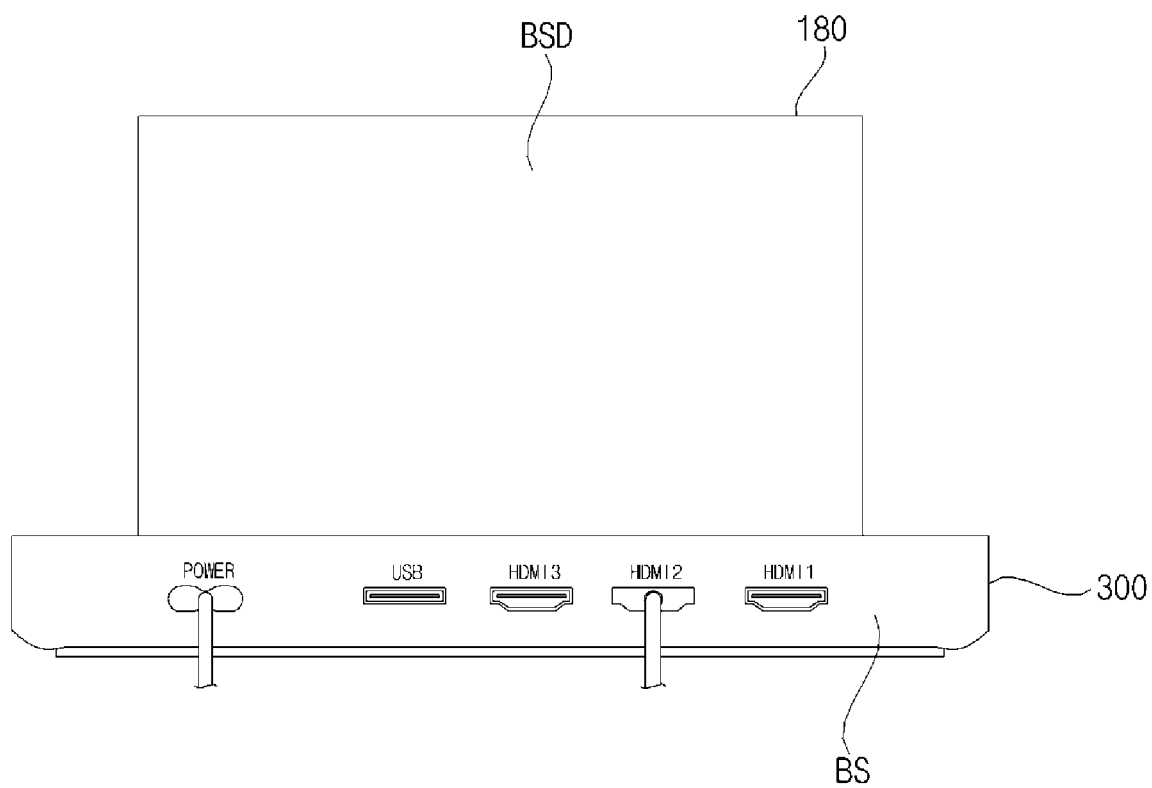

Next, FIG. 7B is a view showing the rear surface of the image display apparatus 100, in particular, the rear surface (BDS) of the display 180. In this example, the plurality of external input terminals and the power terminal are disposed on the rear surface of the signal processing device 300.

In particular, FIG. 7B illustrates that the HDMI1 terminal, the HDMI2 terminal, the HDMI3 terminal, the USB terminal, and the power terminal are arranged on the rear surface of the signal processing device 300 from right to left.

Next, the controller 170 of the image display apparatus 100 may receive an external input display command (S620). If the corresponding external input terminal is not connected with an external device (S630), the controller 170 of the image display apparatus 100 may change the size of the display (S640).

Then, the controller 170 of the image display apparatus 100 may control an external input object to be displayed at a position corresponding to the unconnected external input terminal (S650).

Specifically, based on an external input display command, the controller 170 of the image display apparatus 100 controls the drive unit 175 to roll down the display 180, and controls a plurality of external input objects 741 to 747 corresponding to the plurality of external input terminals HDMI1 to HDMI3 and USB to be displayed at positions corresponding to the plurality of external input terminals HDMI1 to HDMI3 and USB within the rolled-down display 180. Accordingly, an external device may be guided so as to be easily connected to an external input terminal disposed on the rear surface of the image display apparatus.

In particular, since the plurality of external input objects 741 to 747 corresponding to the plurality of external input terminals HDMI1 to HDMI3 and USB is displayed, the user can immediately identify the position of an external input terminal to be connected. Further, since the height of the rollable display 180 is reduced, an external device to be connected may be easily guided so as to be connected to an external connection terminal. Therefore, user convenience may be enhanced.

Figure 7C:
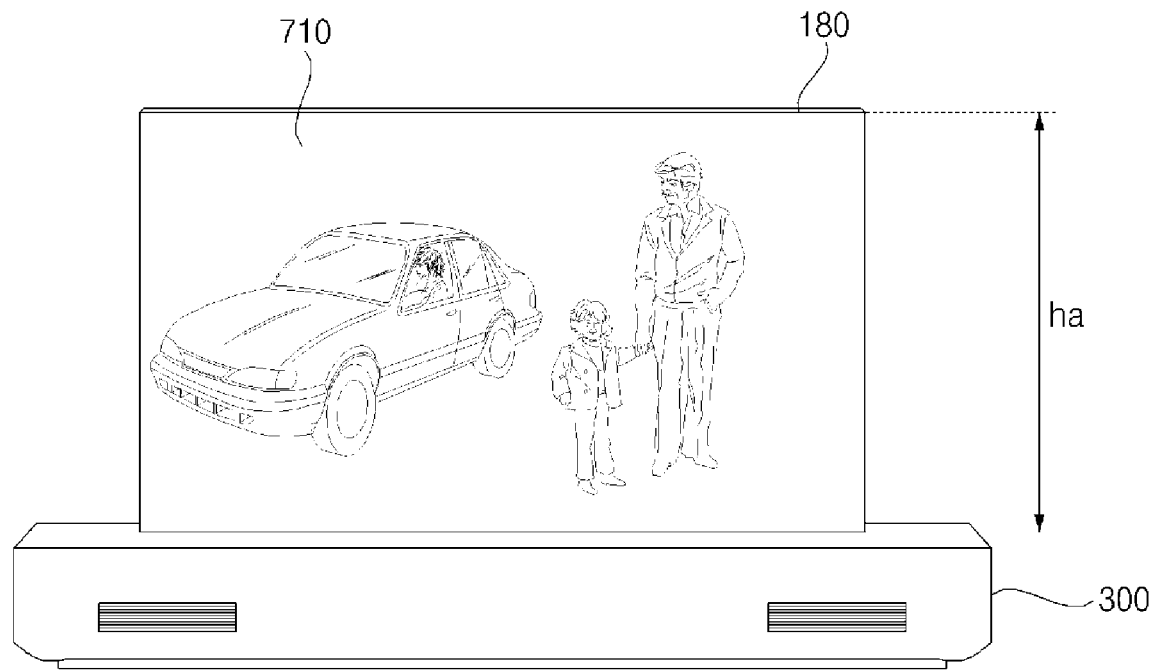
Figure 7C:
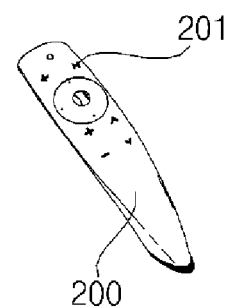

FIG. 7C illustrates operation of an external input key 201 of the remote controller 200 performed with a predetermined image 710 displayed.

Figure 7D:
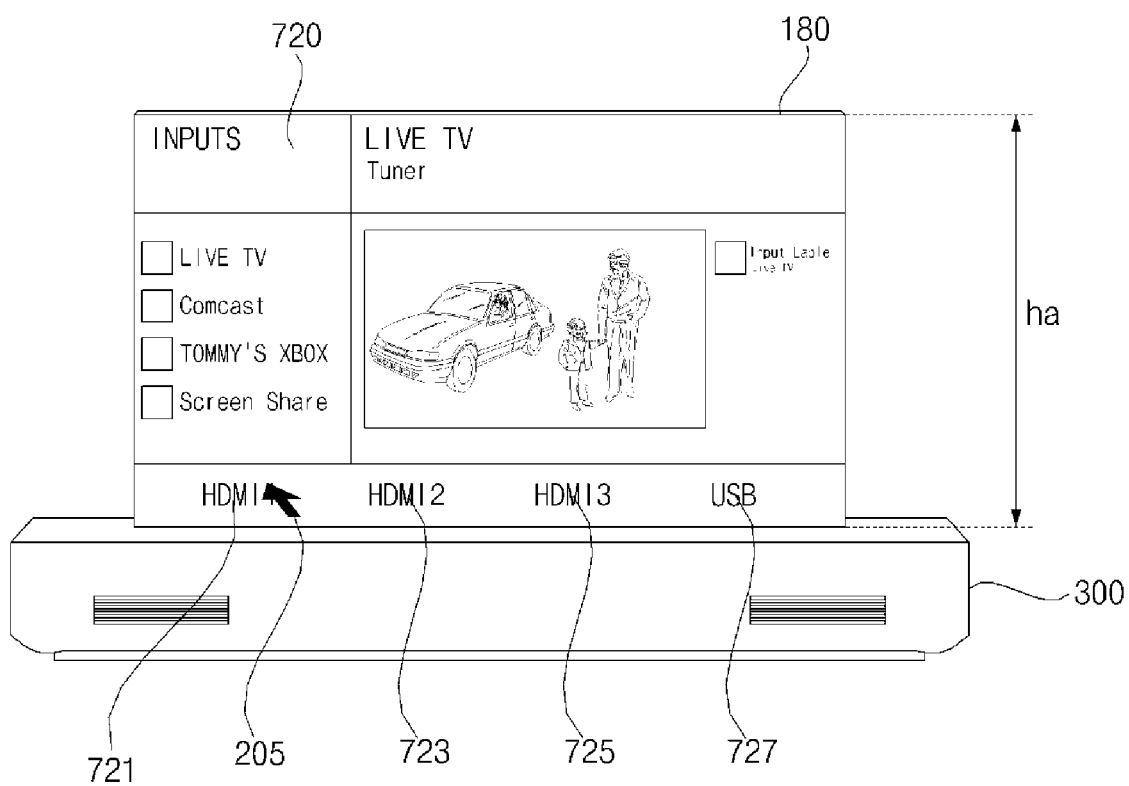
Figure 7D:
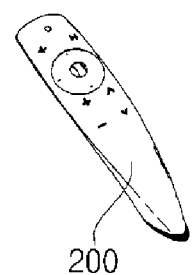

When an external input signal is received by the operation of the external input key 201 of the remote controller 200, the controller 170 of the image display apparatus 100 may control an external input menu 720 including a plurality of external input terminal items 721 to 727 to be displayed, as shown in FIG. 7D.

FIG. 7D illustrates an HDMI1 terminal item 721, an HDMI2 terminal item 723, an HDMI3 terminal item 725, and a USB terminal item 727 among a plurality of external input terminal items 721 to 727.

As shown in FIG. 7D, the controller 170 of the image display apparatus 100 may control a pointer 205 corresponding to movement of the remote controller 200 to be displayed. When a first external input terminal item 721 is selected from among the plurality of external input terminal items 721 to 727 based on the pointer 205 and no external device is connected to the first external input terminal HDMI1, the controller 170 may control the drive unit 175 to roll down the display 180, based on an external input display command.

Alternatively, when the first external input terminal item is selected from among the plurality of external input terminal items and no external device is connected to the first external input terminal, the controller 170 of the image display apparatus 100 may control the drive unit 175 to roll down the display 180 based on the external input display command.

Figure 7E:
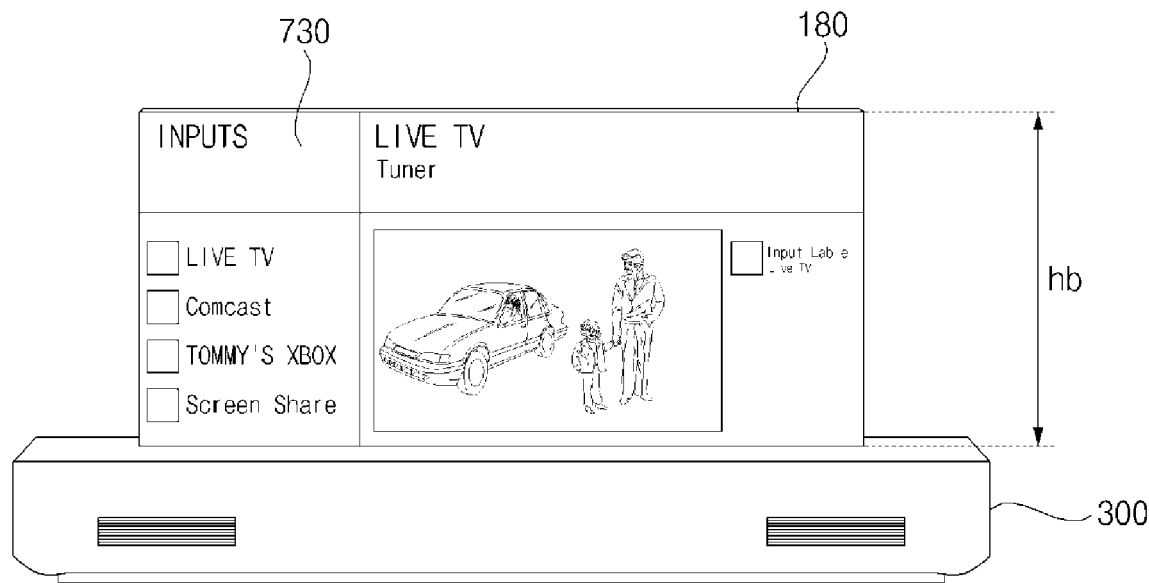

Accordingly, as shown in FIG. 7E, the display 180 may be rolled down. FIG. 7E illustrates that the display 180 has a height of hb, which is less than ha, while being rolled down.

In this case, the controller 170 of the image display apparatus 100 may control a displayed image to be scaled down during rolling down of the display 180 such that a downscaled image 730 is displayed, as shown in FIG. 7E.

Figure 7F:
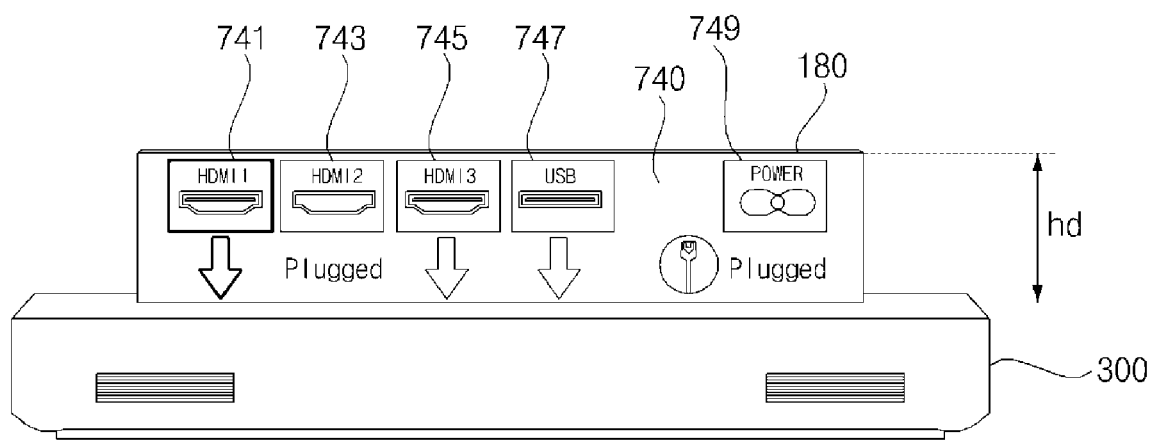

Next, FIG. 7F illustrates that the height of the display 180 becomes a first height hd by rolling down the display 180.

When the height of the display 180 becomes the first height hd by rolling down of the display 180, the controller 170 of the image display apparatus 100 may control a plurality of external input objects 741 to 747 corresponding to the plurality of external input terminals HDMI1 to HDMI3 and USB to be displayed at positions corresponding to the plurality of external input terminals HDMI1 to HDMI3 and USB within the display 180, as shown in FIG. 7F.

Thereby, the user may easily identify the positions of the plurality of external input terminals HDMI1 to HDMI3 and USB disposed on the rear surface of the image display apparatus 100. Accordingly, an external device may be guided so as to be easily connected to an external input terminal disposed on the rear surface of the image display apparatus 100.

Particularly, since the height of the rollable display is reduced, an external device to be connected may be easily guided so as to be connected to an external connection terminal. Therefore, user convenience may be enhanced.

When a first external input terminal HDMI1 is selected from among the plurality of external input terminals HDMI1 to HDMI3 and USB, the controller 170 of the image display apparatus 100 may control a first external input object 741 corresponding to the first external input terminal HDMI1 to be highlighted and displayed among a plurality of external input objects 741 to 747, as shown in FIG. 7F.

Accordingly, the user may easily identify the position of the first external input terminal HDMI1 disposed on the rear surface of the image display apparatus 100. Therefore, the first external device may be guided so as to be easily connected to the first external input terminal HDMI1 disposed on the rear surface of the image display apparatus 100.

Meanwhile, the controller 170 of the image display apparatus 100 may control an external input object 743 corresponding to a pre-connected external input terminal HDMI2 among a plurality of external input objects 741 to 747 to be displayed so as to be distinguished from the external input objects 741, 745, and 747 corresponding to the unconnected external input terminals HDMI1, HDMI3, and USB, as shown in FIG. 7F.

Accordingly, the user may easily distinguish the connected external input terminal from the unconnected external input terminal.

When the height of the display becomes a first height hd by rolling down the display 180, the controller 170 of the image display apparatus 100 may control a power object 749 indicating the power terminal to be displayed at a position corresponding to the power terminal within the display 180, as shown in FIG. 7F. Accordingly, the user may easily perform connection to or detachment from the power terminal.

Figure 7G:
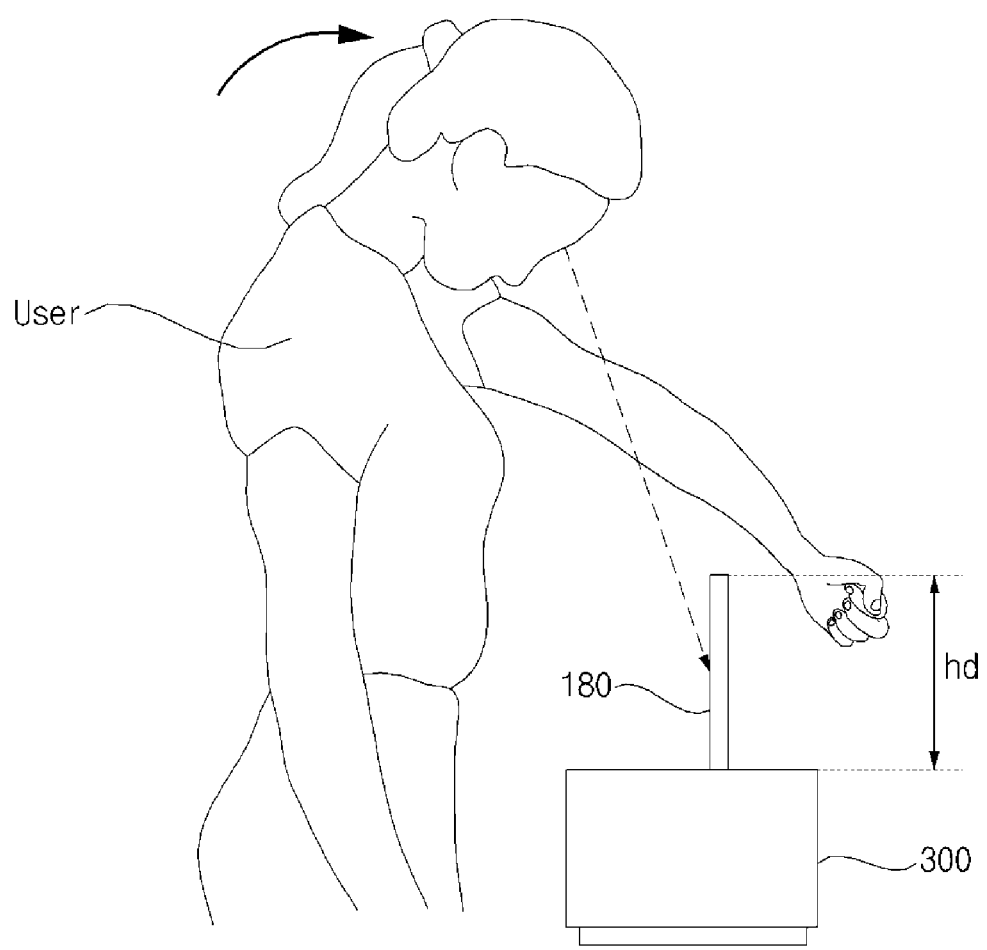

FIG. 7G illustrates that the rollable display 180 is rolled down to have a height of hd.

In connecting the first external device to the first external input terminal HDMI1, the user may easily connect the first external device to the first external input terminal HDMI1 because the rollable display 180 is small in height.

In addition, as shown in FIG. 7F, as the first external input object 741 is displayed at a position corresponding to the first external input terminal HDMI 1, the position of the first external input terminal HDMI 1 may be easily identified.

Figure 7H:
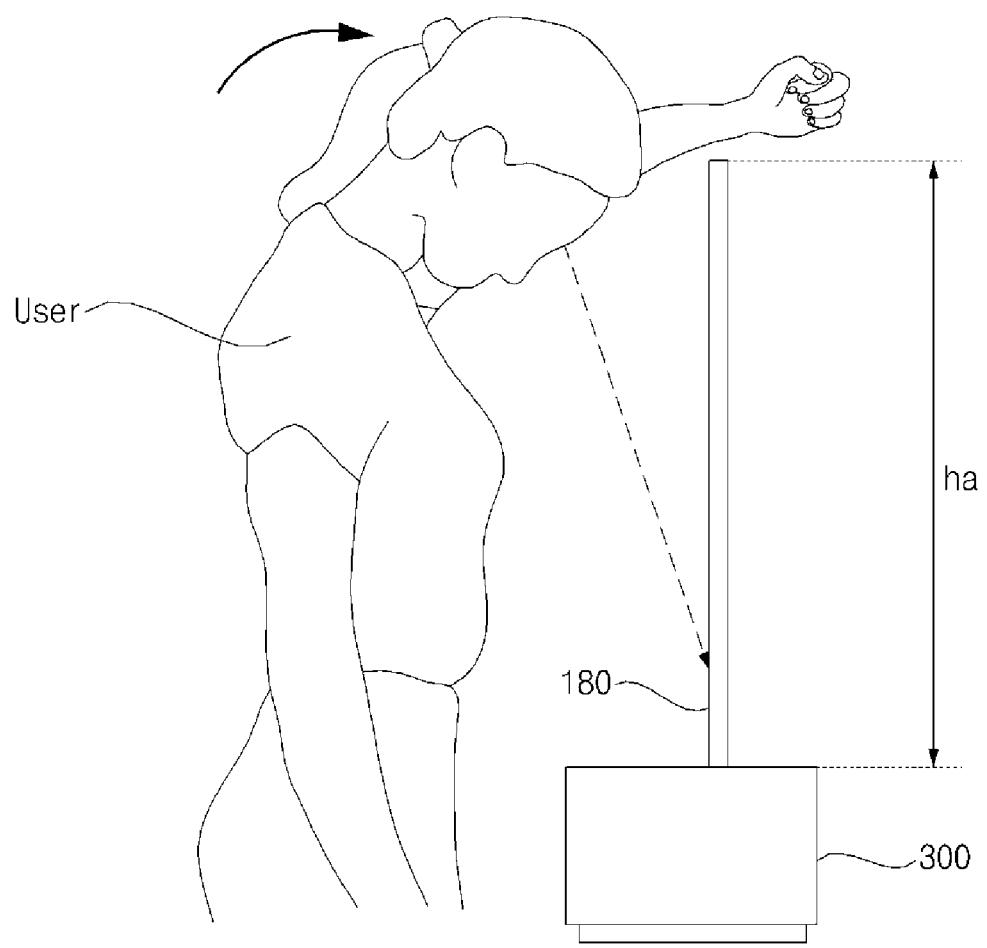

Next, FIG. 7H illustrates that the rollable display 180 has a height of ha.

In the case of the figure, the user cannot easily connect the first external device to the first external input terminal HDMI1 because the rollable display 180 is significantly high.

In FIG. 7G, when the rollable display 180 is rolled down to have a height hd, a plurality of external input objects 741 to 743 corresponding to the plurality of external input terminals HDMI1 to HDMI3 and USB are displayed. Alternatively, only the first external input object 741 corresponding to the first external input terminal HDMI1 selected from among the plurality of external input terminals HDMI1 to HDMI3 and USB may be displayed.

That is, according to another embodiment of the present invention, when the first external input terminal HDMI1 is selected from among the plurality of external input terminals HDMI1 to HDMI3 and USB, the controller 170 of the image display apparatus 100 controls the drive unit 175 to roll down the display 180 and controls the first external input object 741 corresponding to the first external input terminal HDMI1 to be displayed at a position corresponding to the first external input terminal HDMI1 within the rolled-down display 180. Accordingly, the external device may be guided so as to be easily connected to an external input terminal disposed on the rear surface.

In particular, by displaying the first external input object 741 corresponding to the selected first external input terminal HDMI1, the user may immediately identify the position of the external input terminal to be connected. Further, since the height of the rollable display 180 is reduced, an external terminal to be connected may be easily guided so as to be connected to an external connection terminal. Therefore, user convenience may be enhanced.

While FIGS. 7A to 7H illustrate that the rollable display is vertically rolled up or down, embodiments of the present invention are not limited thereto. The rollable display may be horizontally rolled. Details will be described with reference to FIGS. 8A to 8F.

Figure 8A:
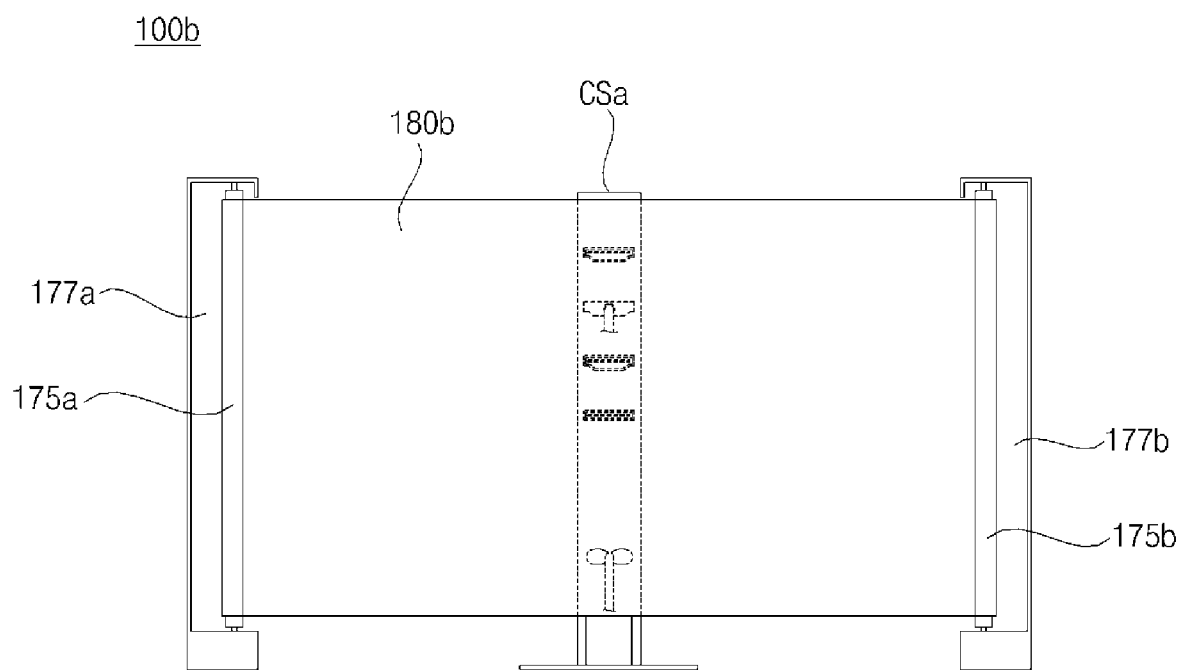

FIG. 8A illustrates an image display apparatus 100b according to another embodiment of the present invention.

Referring to FIG. 8A, the image display apparatus 100b according to another embodiment of the present invention may include a rollable display 180, first and second rollers 175a and 175b disposed at both side ends of the rollable display 180, first and second drive units 177a and 177b disposed at both side ends of the rollable display 180 to drive the first and second rollers 175a and 175b to change the size of the rollable display 180, and a support CSa disposed at a rear end of the display 180 and arranged between the first and second drive units 177a and 177b.

FIG. 8A is a front view showing an image display apparatus 100b, which illustrates that a plurality of external input terminals HDMI1 to HDMI3 and USB and a power terminal are arranged from an upper side to the lower side on the rear surface of the support CSa.

Figure 8B:
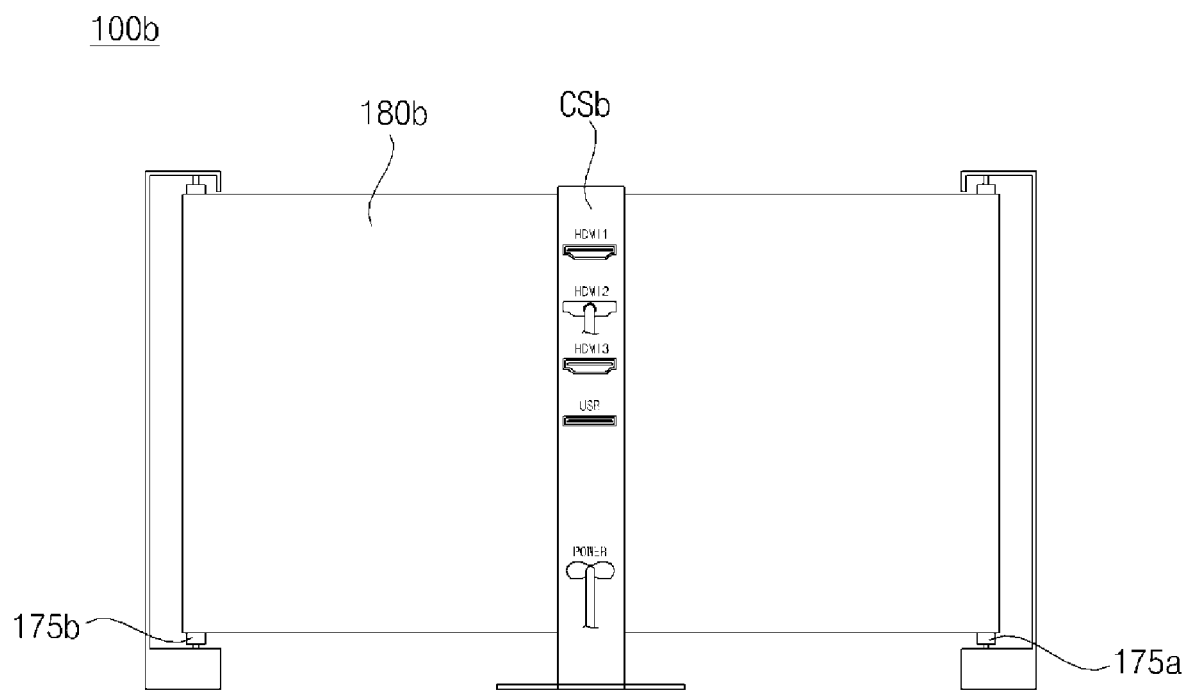

FIG. 8B is a rear view showing the image display apparatus 100b, which illustrates that the plurality of external input terminals HDMI1 to HDMI3 and USB and the power terminal are arranged from the upper side to the lower side on the rear surface CSb of the support CSa.

Figure 8C:
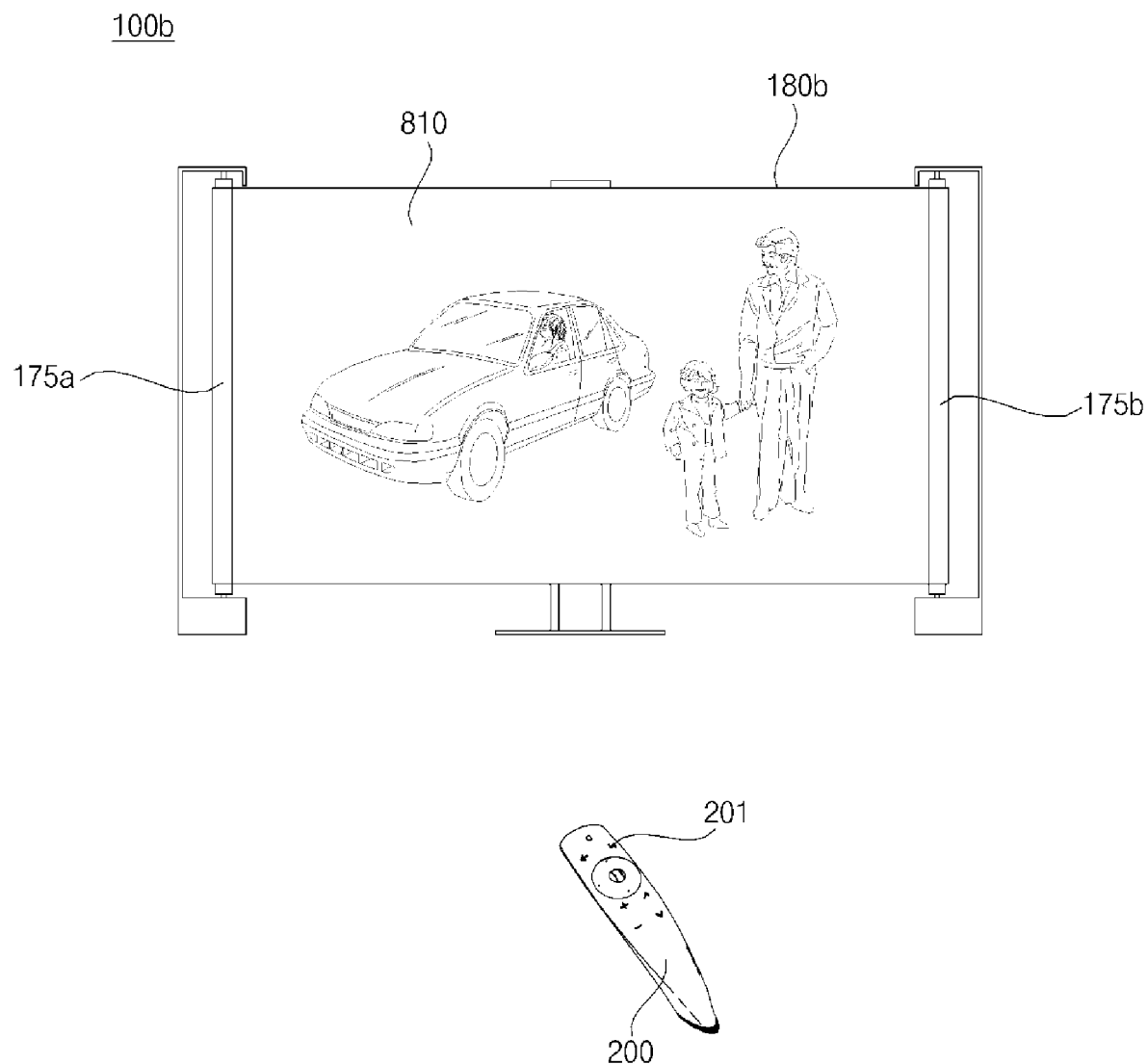

FIG. 8C illustrates operation of the external input key 201 of the remote controller 200 performed with a predetermined image 810 displayed.

Figure 8D:
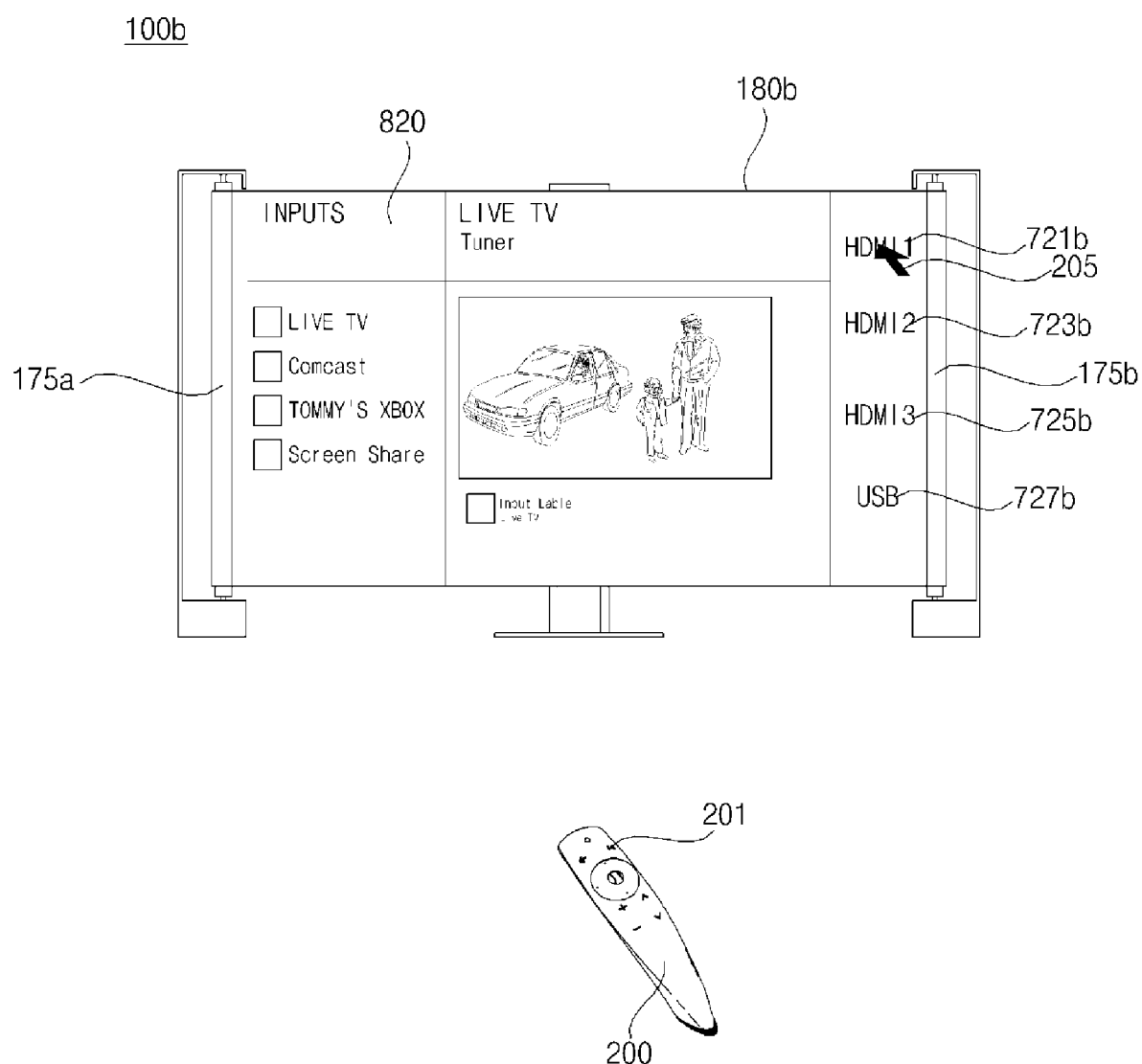

When an external input signal is received by operation of the external input key 201 of the remote controller 200, the controller 170 of the image display apparatus 100b may perform a control operation to display an external input menu 820 including a plurality of external input terminal items 821 to 727, as shown in FIG. 8D.

FIG. 8D illustrates an HDMI1 terminal item 721b, an HDMI2 terminal item 723b, an HDMI3 terminal item 725b, and a USB terminal item 725b among a plurality of external input terminal items 721b to 727b.

As shown in FIG. 8D, the controller 170 of the image display apparatus 100b may control a pointer 205 corresponding to movement of the remote controller 200 to be displayed. When a first external input terminal item 721b is selected from among the plurality of external input terminal items 721b to 727b based on the pointer 205 and no external device is connected to the first external input terminal HDMI1, the controller 170 may control at least one of the drive units 177a and 177b such that the display 180 is rolled to have a reduced size based on an external input display command.

Alternatively, when the first external input terminal item is selected from among the plurality of external input terminal items and no external device is connected to the first external input terminal, the controller 170 of the image display apparatus 100b may control at least one of the drive units 177a and 177b such that the display 180 is rolled to have a reduced size based on the external input display command.

Figure 8E:
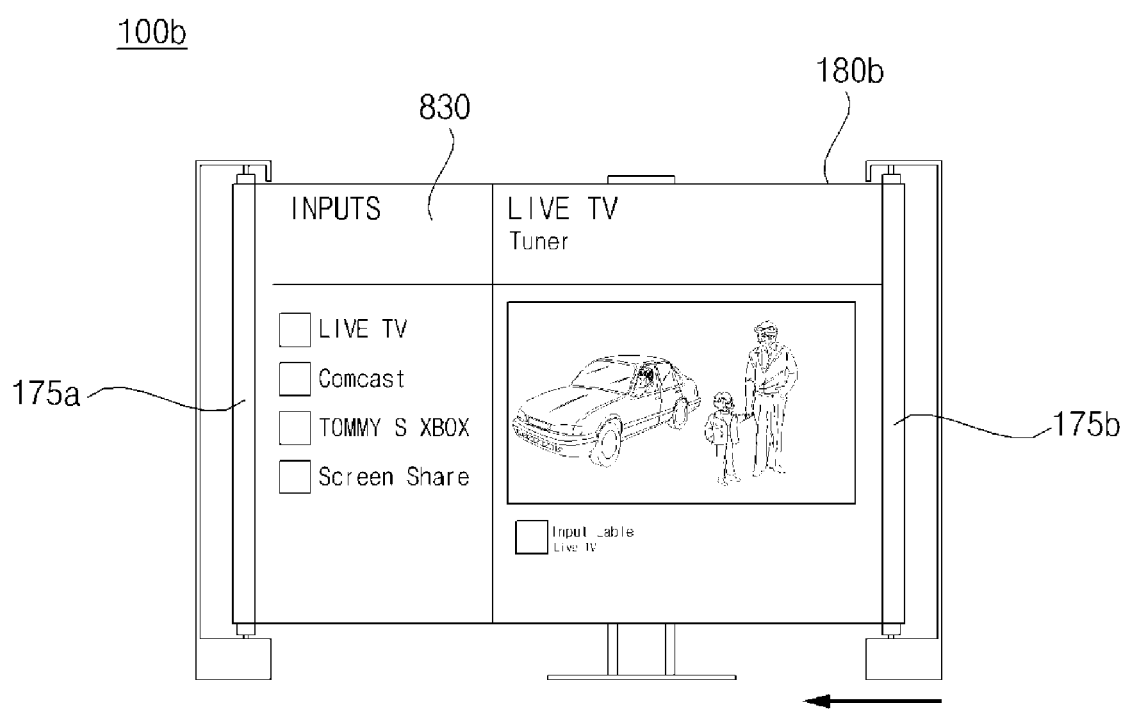

FIG. 8E illustrates that the second roller 175b is rotated by the second drive unit 177b between the first and second drive units 177a and 177b and thus the right area of the display 180 is narrowed.

That is, the right side of the display 180 is rolled, and thus the display 180 is rolled toward the support Csa.

In this case, while the size of display 180 is reduced, the controller 170 of the image display apparatus 100b may scale down the displayed image, thereby controlling a downscaled image 830 to be displayed as shown in FIG. 8E.

Figure 8F:
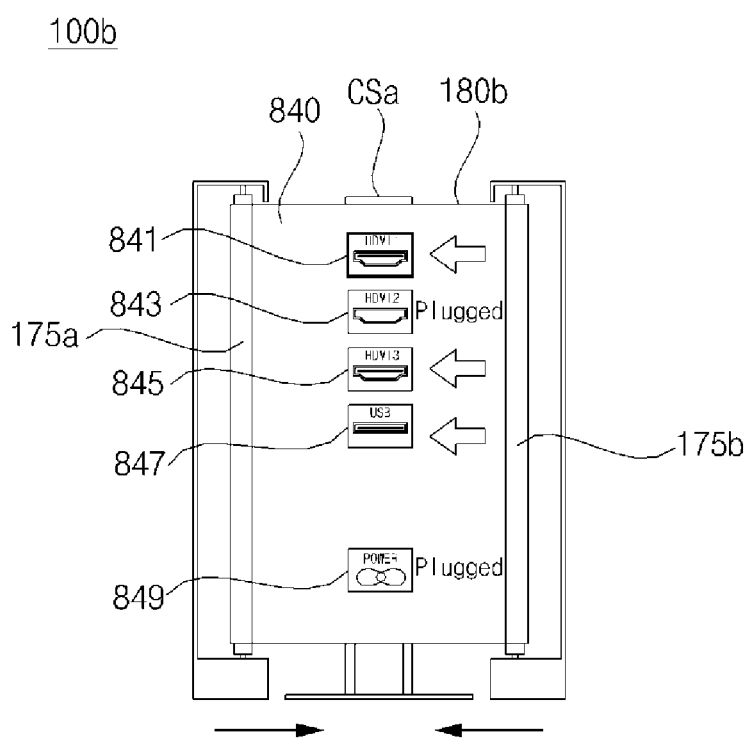

Next, FIG. 8F illustrates that both the first and second drive units 177a and 177b operate, and thus the first and second rollers 175a and 175b rotate such that both sides of the display 180 are rolled.

That is, the left and right sides of the display 180 are respectively rolled and thus the display 180 is rolled toward the support Csa.

In this case, when the display 180 is rolled and thus the width of the display 180 is reduced, the controller 170 of the image display apparatus 100b may control a plurality of external input objects 841 to 847 corresponding to the plurality of external input terminals HDMI1 to HDMI3 and USB to be displayed at positions corresponding to the plurality of external input terminals HDMI1 to HDMI3 and USB within the display 180, as shown in FIG. 8F.

Thereby, the user may easily identify the positions of the plurality of external input terminals HDMI1 to HDMI3 and USB disposed on the rear surface of the image display apparatus 100b. Accordingly, an external device may be easily connected to an external input terminal disposed on the rear surface of the image display apparatus 100b.

Particularly, since the width of the rollable display 180 is reduced, an external device to be connected may be easily guided so as to be connected to an external connection terminal. Therefore, user convenience may be enhanced.

When a first external input terminal HDMI1 is selected from among the plurality of external input terminals HDMI1 to HDMI3 and USB, the controller 170 of the image display apparatus 100b may control a first external input object 841 corresponding to the first external input terminal HDMI1 to be highlighted and displayed among a plurality of external input objects 841 to 847, as shown in FIG. 8F.

Accordingly, the user may easily identify the position of the first external input terminal HDMI1 disposed on the rear surface of the image display apparatus 100b. Therefore, the first external device may be guided so as to be easily connected to the first external input terminal HDMI1 disposed on the rear surface of the image display apparatus 100b.

Meanwhile, the controller 170 of the image display apparatus 100b may control an external input object 843 corresponding to a pre-connected external input terminal HDMI2 among a plurality of external input objects 841 to 847 to be displayed so as to be distinguished from the external input objects 841, 845, and 847 corresponding to the unconnected external input terminals HDMI1, HDMI3, and USB, as shown in FIG. 8F.

Accordingly, the user may easily distinguish the connected external input terminal from the unconnected external input terminal.

When the display 180 is rolled and thus the width of the display 180 is reduced, as shown in FIG. 8F, the controller 170 of the image display apparatus 100b may control a power object 849 indicating the power terminal to be displayed at a position corresponding to the power terminal within the display 180. Accordingly, the user may easily perform connection to or detachment from the power terminal.

If there is no image displayed for a predetermined time with the display 180 having a second height ha, the controller 170 of the image display apparatus 100b may control the drive unit 175 to roll down the display 180, and control a plurality of external input objects 741 to 747 corresponding to the plurality of external input terminals HDMI1 to HDMI3 and USB to be displayed at positions corresponding to the plurality of external input terminals HDMI1 to HDMI3 and USB within the rolled-down display. Details will be described with reference to FIGS. 9A to 9E.

Figure 9A:
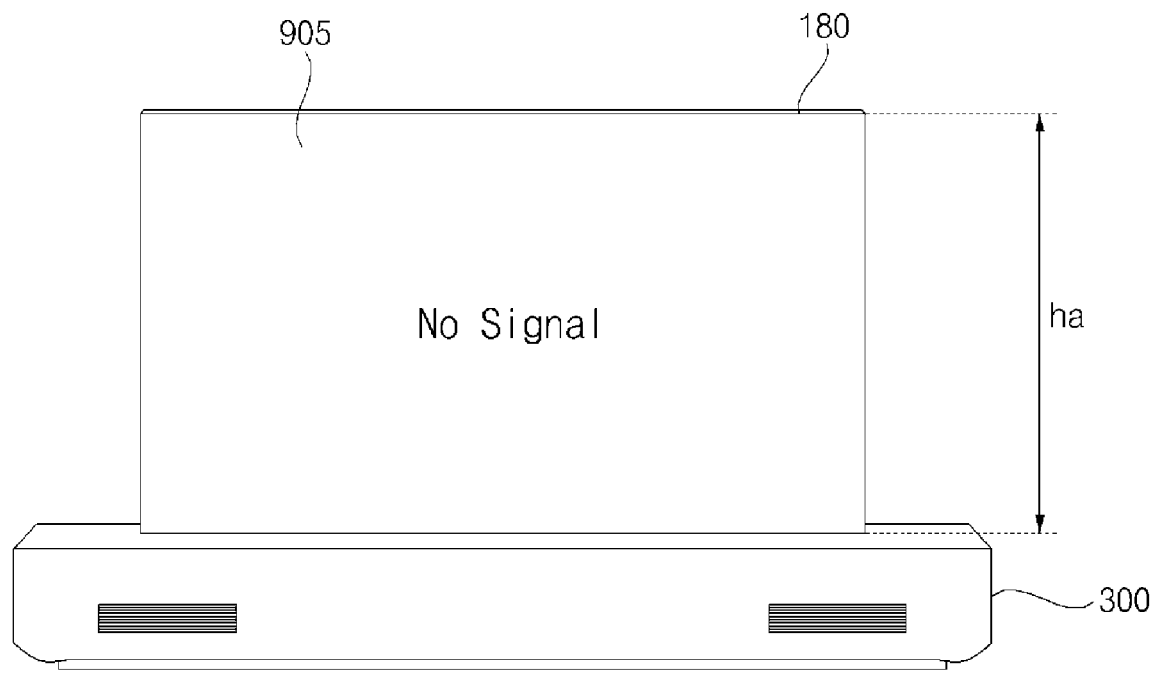

First, FIG. 9A illustrates a case where there is no image displayed for a predetermined time while the height of the display 180 is ha.

In this case, the controller 170 of the image display apparatus 100b may control the drive unit 175 to roll the display 180 down.

Figure 9B:
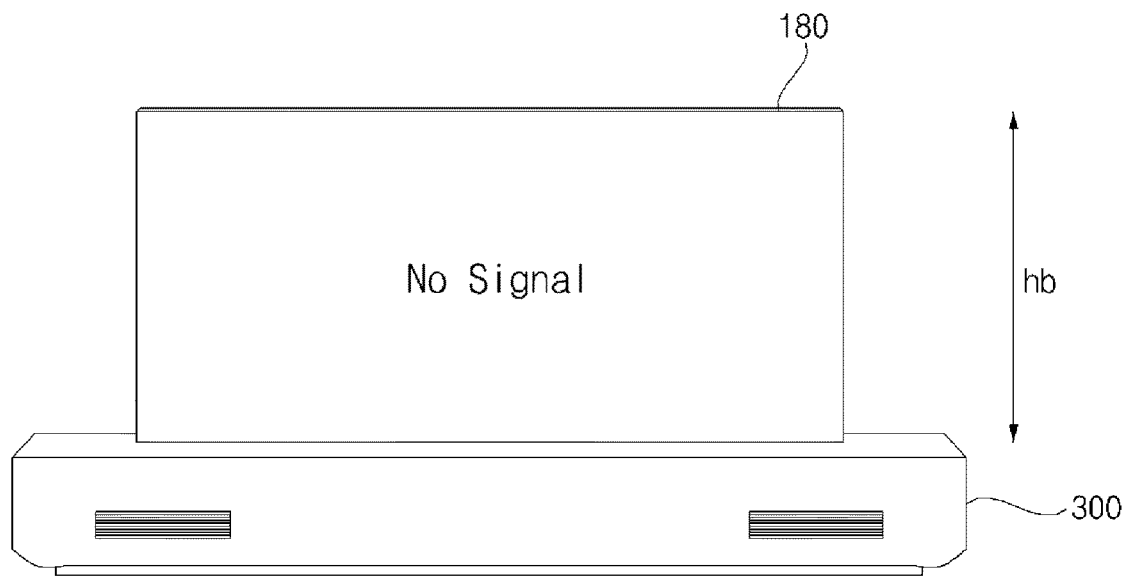

FIG. 9B illustrates that the height of the display 180 becomes hb by rolling down the display 180.

Figure 9C:
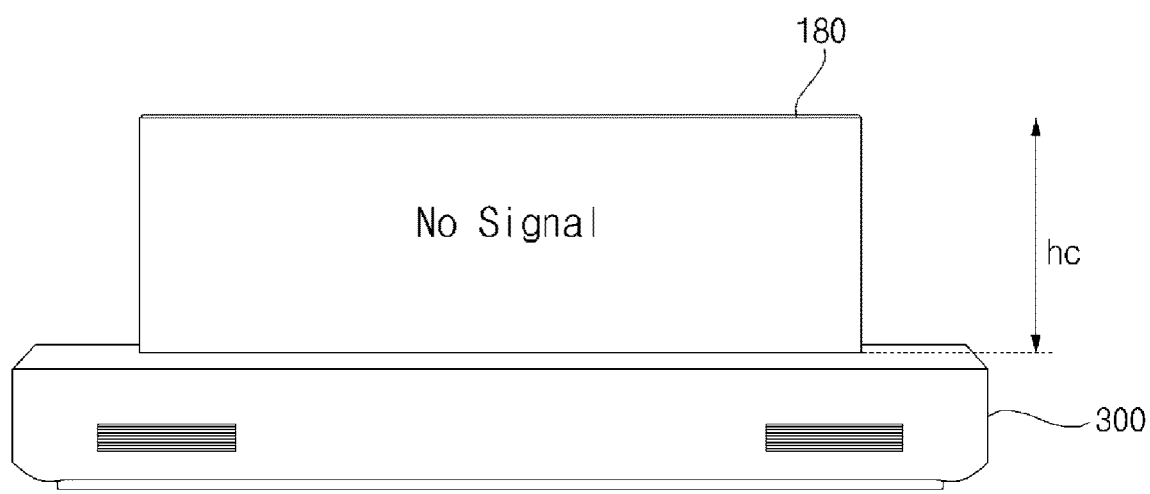

Next, FIG. 9C illustrates that the height of the display 180 becomes hb as the display 180 continues to roll down.

Figure 9D:
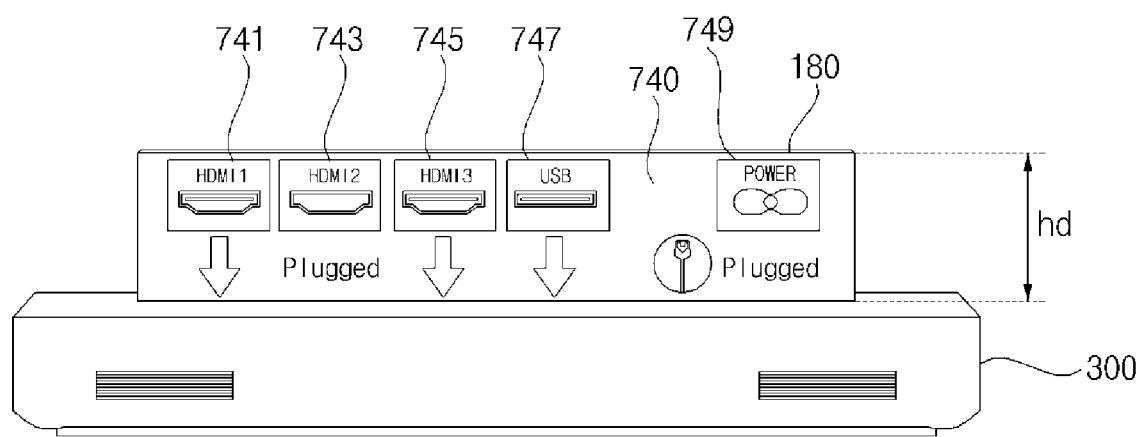

Next, FIG. 9D illustrates that the height of the display 180 becomes hd as the display 180 continues to roll down.

When the height of the display 180 becomes the first height by rolling down of the display 180, the controller 170 of the image display apparatus 100 may control a plurality of external input objects 741 to 747 corresponding to the plurality of external input terminals HDMI1 to HDMI3 and USB to be displayed at positions corresponding to the plurality of external input terminals HDMI1 to HDMI3 and USB within the display 180, as shown in FIG. 9D.

At this time, the controller 170 of the image display apparatus 100 may control external input objects 741 to 747 corresponding to pre-connected external input terminals among a plurality of external input objects 741 to 747 to be displayed so as to be distinguished from external input objects 741 to 747 corresponding to the unconnected external input terminals, as shown in FIG. 9D.

Figure 9E:

If there is no separate external device connected for a second predetermined time with a plurality of external input objects 741 to 747 displayed, as shown in FIG. 9D, the controller 170 of the image display apparatus 100 may determine that the user does not desire to view an external input image through connection of the external device any longer, and thus control the display 180 to be rolled down and wound around the signal processing device 300 to reduce power consumption as shown in FIG. 9E.

FIG. 9E illustrates that the display 180 is rolled down and wound into the signal processing device 300 so as not to be exposed to the outside after the second predetermined time.

Meanwhile, the image display apparatus 100 according to an embodiment of the present invention may further include a sensor unit (not shown) for sensing an object approaching the side surface or rear surface of the signal processing device 300.

Upon sensing an approach to the side surface or rear surface of the signal processing device 300, the controller 170 of the image display apparatus 100 may control the drive unit 175 to roll down the display 180, and control a plurality of external input objects 741 to 747 corresponding to the plurality of external input terminals HDMI1 to HDMI3 and USB to be displayed at positions corresponding to the plurality of external input terminals HDMI1 to HDMI3 and USB within the rolled-down display 180. This operation will be described with reference to FIGS. 10A to 10D.

Figure 10A:
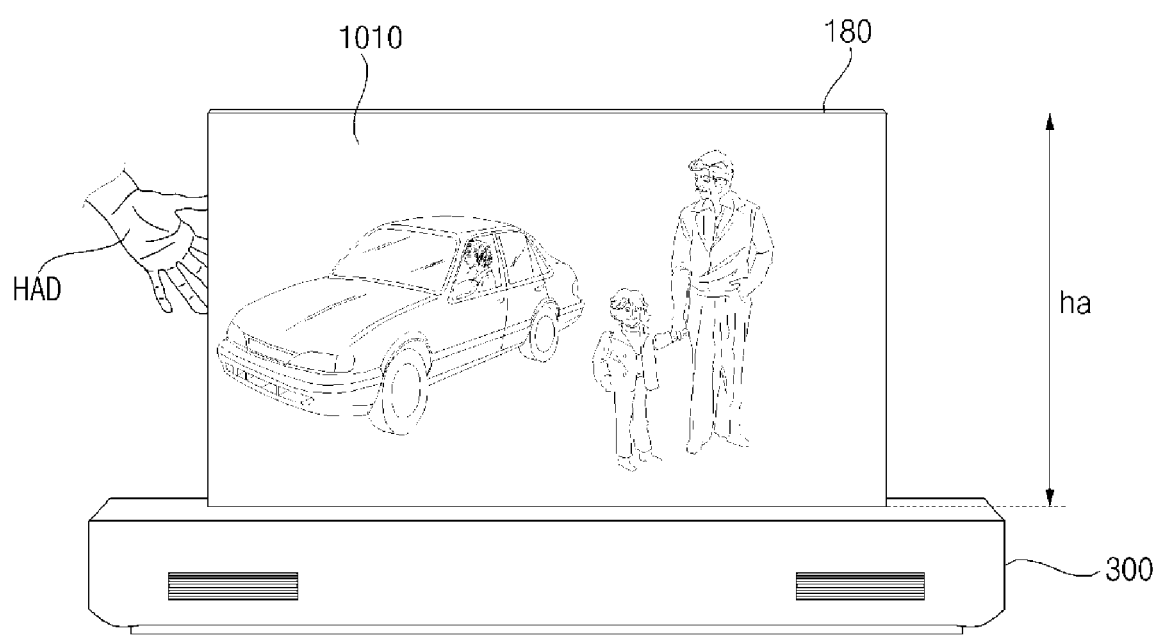

FIG. 10A illustrates that a predetermined image 1010 is displayed while the height of the display 180 is ha.

When approach of a user's hand HAD to the side surface or rear surface of the signal processing device 300 is sensed in a situation where the height of the display 180 is ha and the predetermined image 1010 is displayed, the controller 170 of the image display apparatus 100b may determine, through the sensor unit (not shown), that the user is attempting to connect an external device to the external input terminal, and thus control the drive unit 175 to roll down the display 180.

The sensor unit (not shown) may include a proximity sensor or an ultrasonic sensor.

Figure 10B:
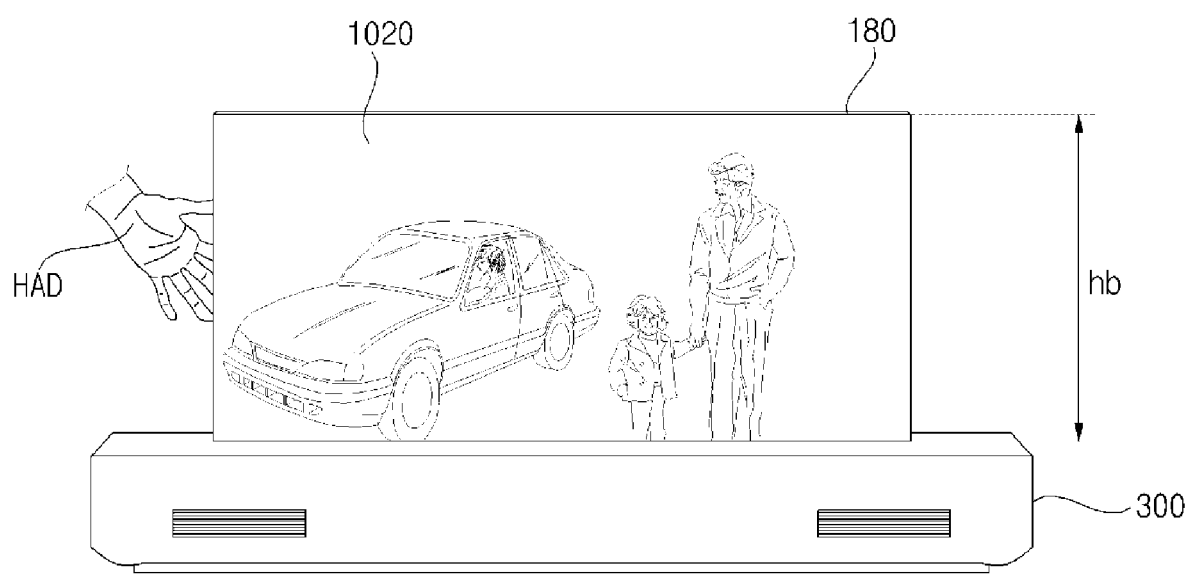

FIG. 10B illustrates that the height of the display 180 becomes hb by rolling down of the display 180.

Figure 10C:
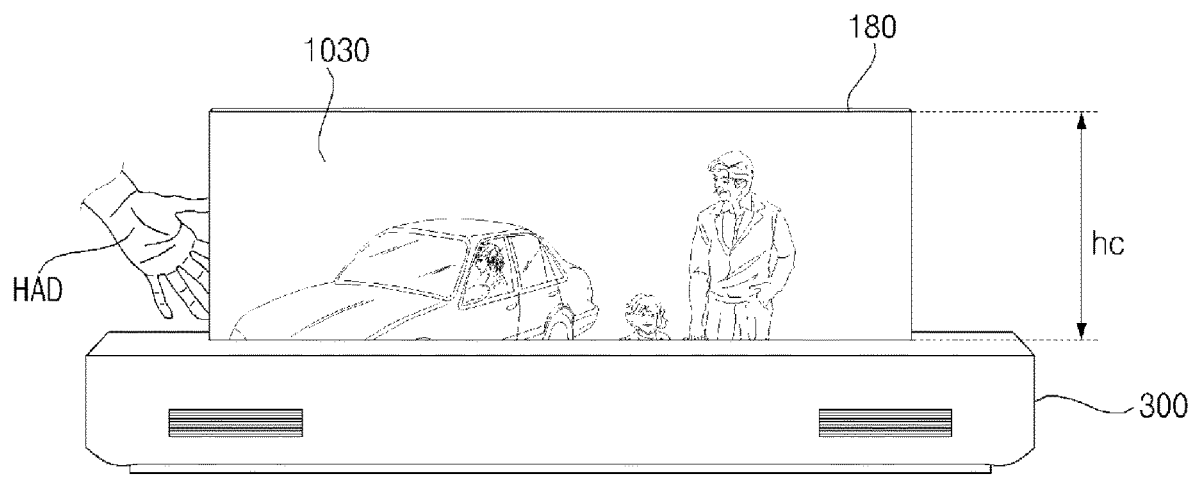

Next, FIG. 10C illustrates that the height of the display 180 becomes hc as the display 180 continues to roll down.

Figure 10D:
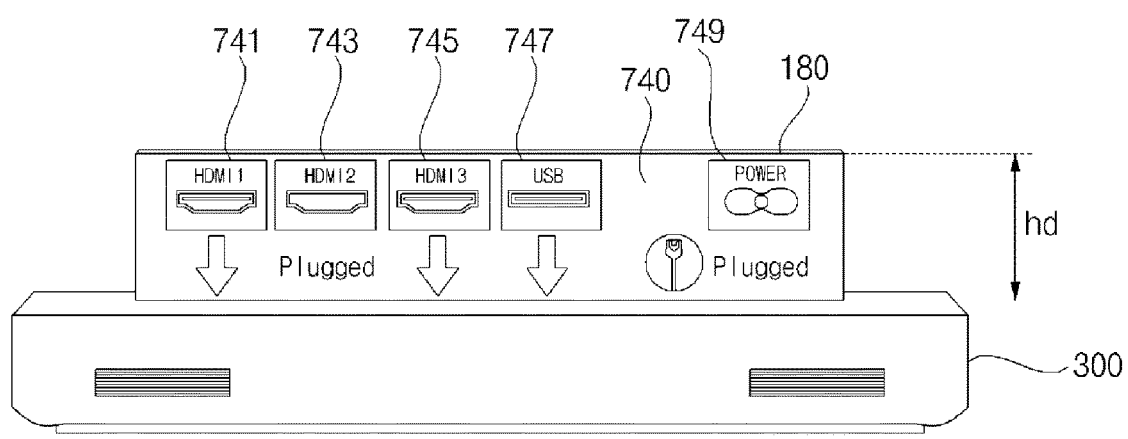

Next, FIG. 10D illustrates that the height of the display 180 becomes hd as the display 180 continues to roll down.

When the height of the display 180 becomes the first height by rolling down of the display 180, the controller 170 of the image display apparatus 100 may control a plurality of external input objects 741 to 747 corresponding to the plurality of external input terminals HDMI1 to HDMI3 and USB to be displayed at positions corresponding to the plurality of external input terminals HDMI1 to HDMI3 and USB within the display 180, as shown in FIG. 10D.

At this time, the controller 170 of the image display apparatus 100 may control external input objects 741 to 747 corresponding to pre-connected external input terminals among a plurality of external input objects 741 to 747 to be displayed so as to be distinguished from external input objects 741 to 747 corresponding to the unconnected external input terminals, as shown in FIG. 10D.

Thus, the user may identify the positions of the external input terminals and easily connect the external device.

Meanwhile, the controller 170 of the image display apparatus 100 may perform mirroring through the paired mobile terminal 600 via the network interface unit 135.

Figure 11A:
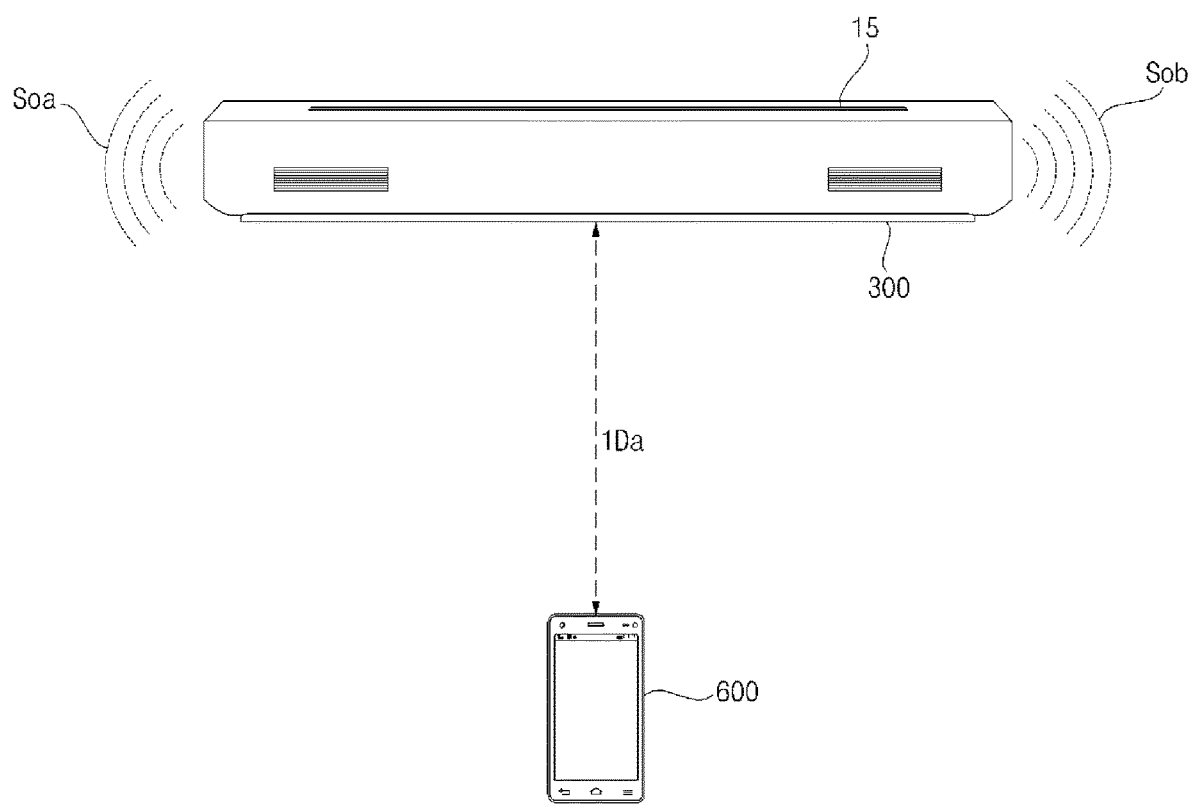

FIG. 11A illustrates that the mobile terminal 600 receives a music playback signal with the display 180 wound in the signal processing device 300, and thus the signal processing device 300 outputs sound Soa, Sob corresponding to the music playback signal.

Meanwhile, the controller 170 of the image display apparatus 100 may calculate the distance between the image display apparatus 100 and the mobile terminal 600 according to the strength of the received music playback signal.

FIG. 11A illustrates that the distance between the image display apparatus 100 and the mobile terminals 600 is 1 Da.

Figure 11B:
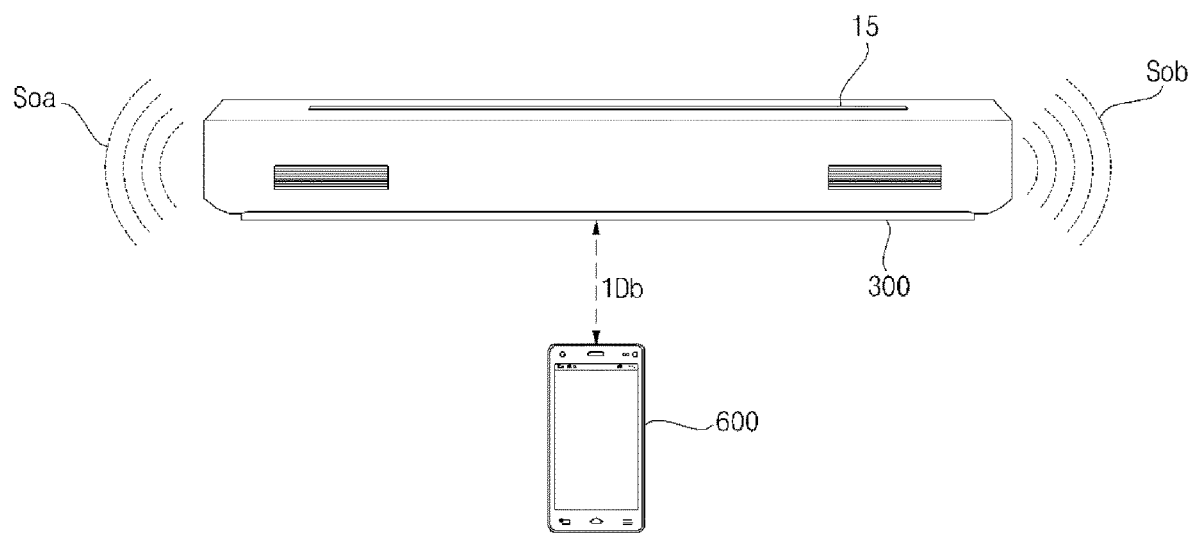

FIG. 11B illustrates that the user moves the mobile terminal 600 further towards the image display apparatus 100 and thus the distance between the image display apparatus 100 and the mobile terminal 600 is 1 Db.

When the distance between the image display apparatus 100 and the mobile terminal 600 is within a predetermined distance, the controller 170 of the image display apparatus 100 may determine that the user is approaching, and thus roll up the display to facilitate connection of an external device to an external connection terminal.

Figure 11C:
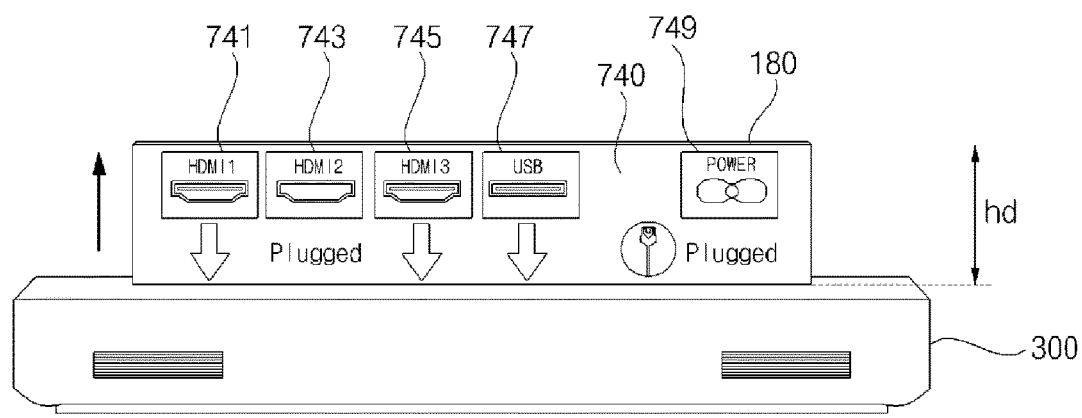

Specifically, when the distance between the image display apparatus 100 and the mobile terminal 600 is within a predetermined distance, the controller 170 of the image display apparatus 100 may control the drive unit 175 to roll up the display unit 180 and a plurality of external input objects 741 to 747 corresponding to the plurality of external input terminals HDMI1 to HDMI3 and USB to be displayed at positions corresponding to the plurality of external input terminals HDMI1 to HDMI3 and USB within the rolled-up display 180, as shown in FIG. 11C. Accordingly, the user may identify the positions of the external input terminals and easily connect the external device.

Figure 12:
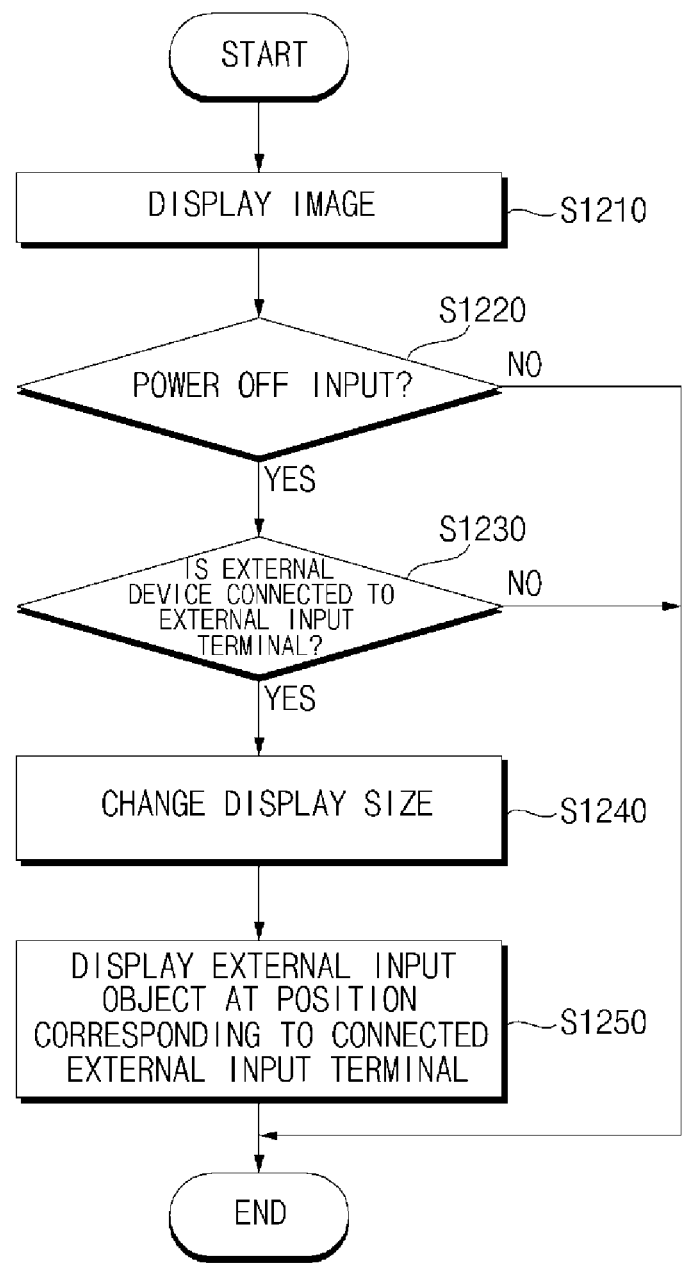
FIG. 12 is a flowchart illustrating an operation method of an image display apparatus having a rollable display according to another embodiment of the present invention.

FIG. 12 is a flowchart illustrating an operation method of an image display apparatus having a rollable display according to another embodiment of the present invention, and FIGS. 13A to 13F are views referred to in the description of the operation method of FIG. 12.

Figure 13A:
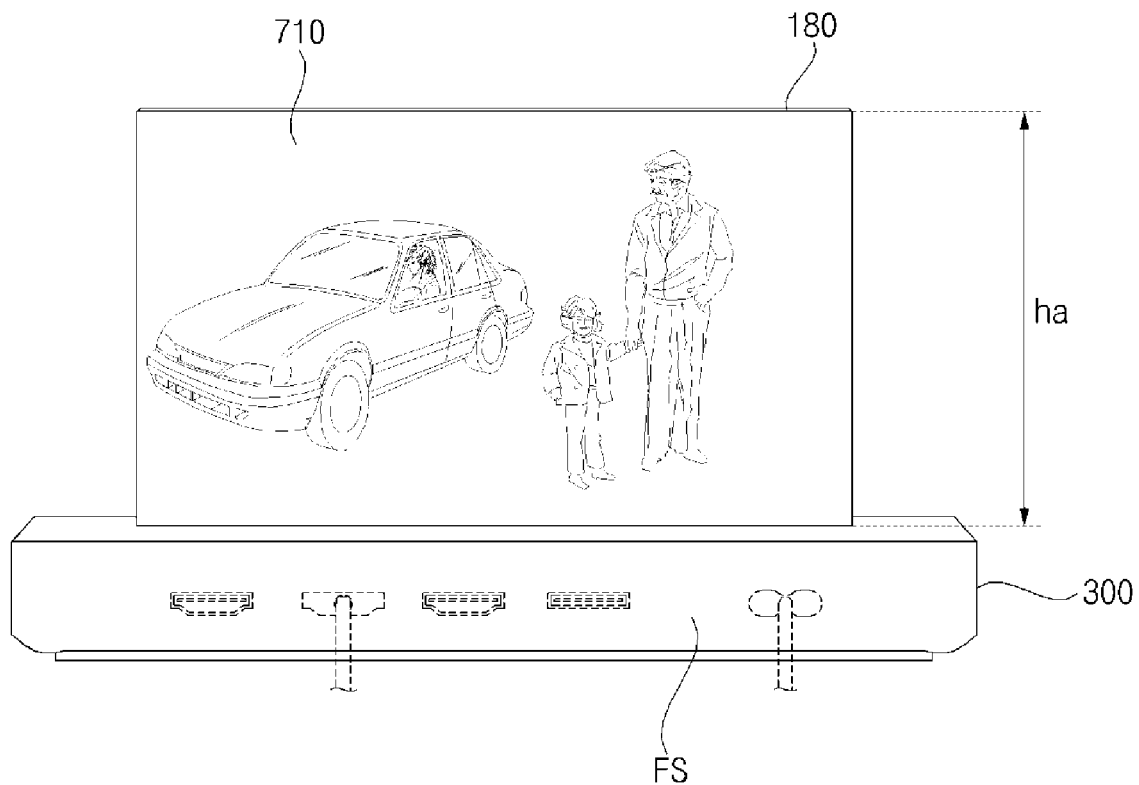
FIGS. 13A to 13F are views referred to in the description of the operation method of FIG. 12.

Referring to FIG. 12, the controller 170 of the image display apparatus 100 may perform a control operation according to an image display input to roll up the rollable display 180 such that the height of the rollable display 180 becomes ha, as shown in FIG. 13A.

Next, the controller 170 of the image display apparatus 100 may perform a control operation according to the image display input to display a predetermined image 710 on the rollable display 180 having the height of ha (S1210).

Here, the predetermined image 710 may be a broadcast image, an external input image, or the like.

FIG. 13A is a view showing the front surface of the image display apparatus 100, in particular, the front surface of the display 180. In this example, a plurality of external input terminals and a power terminal are disposed on the rear surface of the signal processing device 300.

In particular, FIG. 13A illustrates that an HDMI1 terminal, an HDMI2 terminal, an HDMI3 terminal, a USB terminal, and a power terminal are arranged on the rear surface of the signal processing device 300 from left to right.

The HDMI1 terminal, the HDMI2 terminal, the HDMI3 terminal, and the USB terminal may be provided in the external device interface unit 130 of FIG. 2.

Figure 13B:
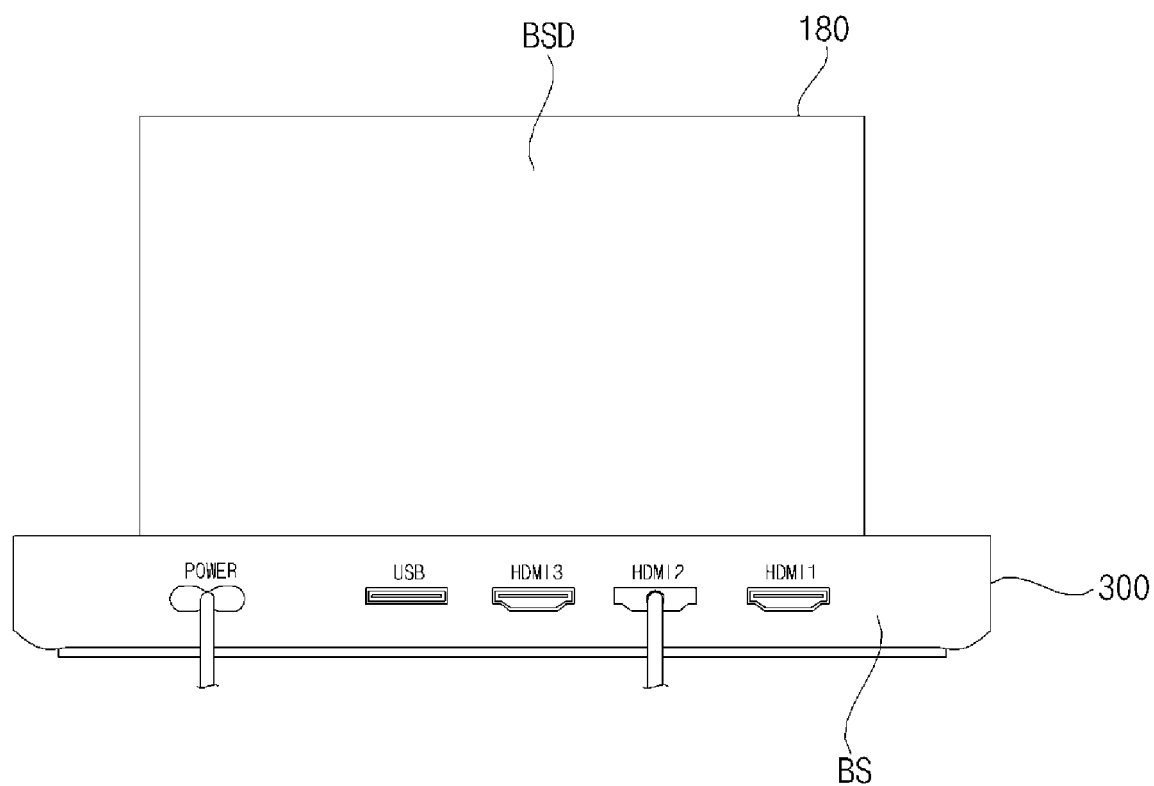

Next, FIG. 13B is a view showing the rear surface of the image display apparatus 100, in particular, the rear surface (BDS) of the display 180. In this example, the plurality of external input terminals and the power terminal are disposed on the rear surface of the signal processing device 300.

In particular, FIG. 13B illustrates that the HDMI1 terminal, the HDMI2 terminal, the HDMI3 terminal, the USB terminal, and the power terminal are arranged on the rear surface of the signal processing device 300 from right to left.

Next, the controller 170 of the image display apparatus 100 may receive a power-off input (S1220). If an external device is connected to an external input terminal (S1230), the controller 170 may control the size of the display size to be changed (S1240).

Then, the controller 170 of the image display apparatus 100 may control an external input object to be displayed at a position corresponding to the connected external input terminal (S1250).

Specifically, based on the power-off input, the controller 170 of the image display apparatus 100 may control the drive unit 175 to roll down the display 180, and a plurality of external input objects 741 to 747 corresponding to a plurality of external input terminals HDMI1 to HDMI3 and USB at positions corresponding to the plurality of external input terminals HDMI1 to HDMI3 and USB in the display 180, and control a plurality of external input objects 741 to 747 corresponding to the plurality of external input terminals HDMI1 to HDMI3 and USB to be displayed at positions corresponding to the plurality of external input terminals HDMI1 to HDMI3 and USB. Thus, the external device may be guided so as to be easily detached from an external input terminal disposed on the rear surface of the image display apparatus.

Particularly, as the plurality of external input objects 741 to 747 corresponding to the plurality of external input terminals HDMI1 to HDMI3 and USB is displayed, the user may immediately identify the position of an external input terminal to be detached. Further, since the height of the rollable display 180 is reduced, the external device may be easily guided so as to be detached from the external connection terminal. Therefore, user convenience may be enhanced.

Figure 13C:
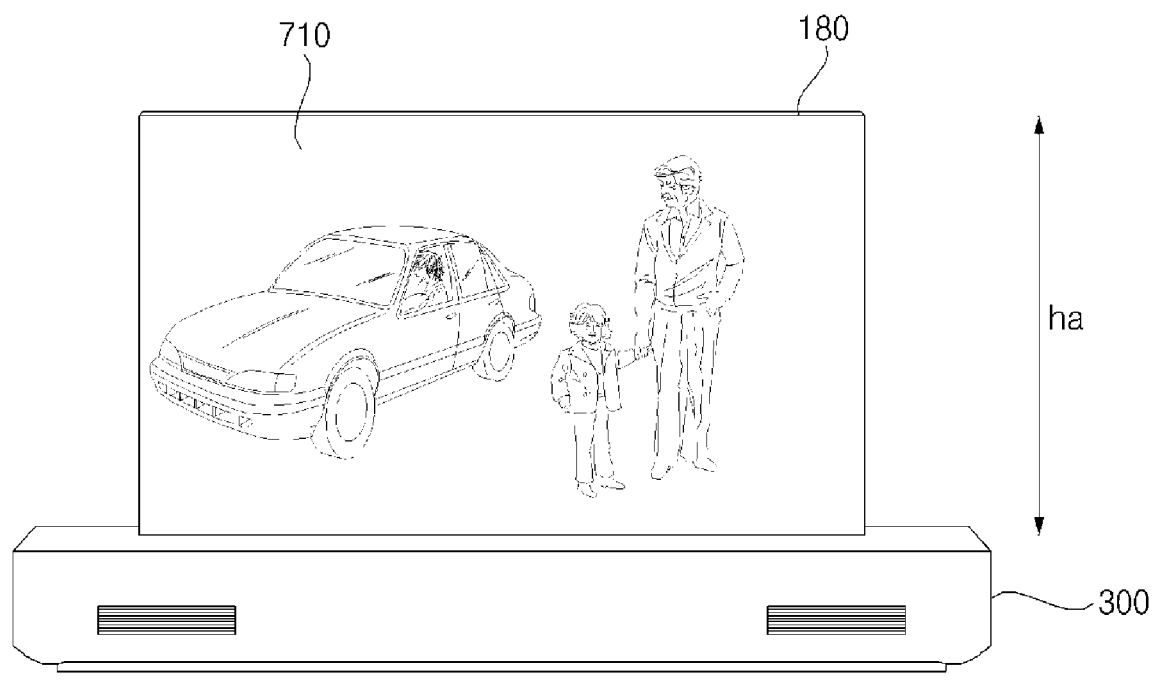
Figure 13C:
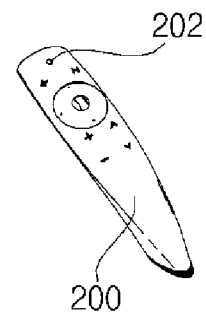

FIG. 13C illustrates operation of a power-off key 202 of the remote controller 200 performed with a predetermined image 710 displayed.

Figure 13D:
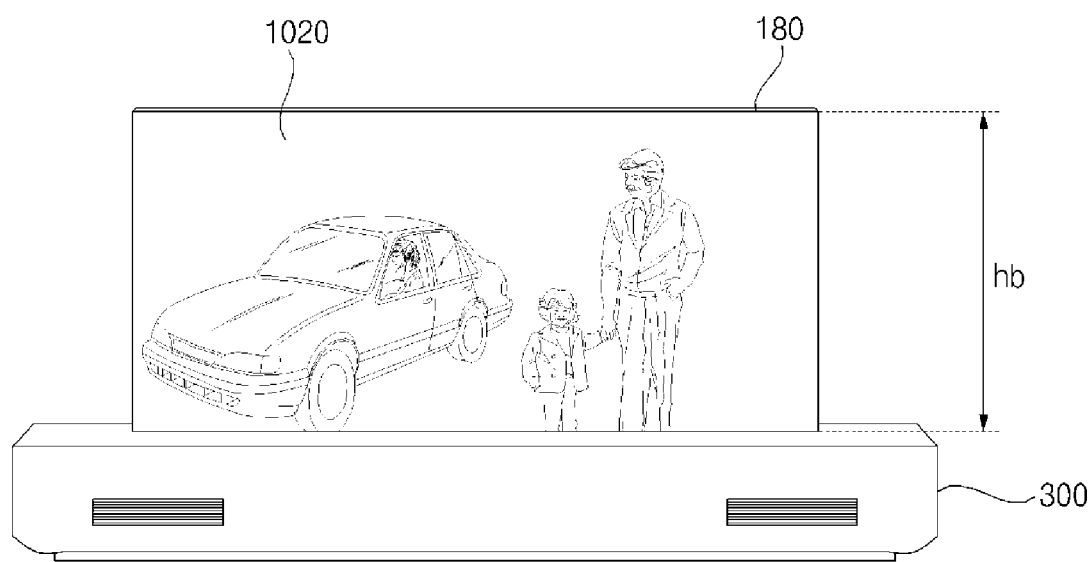

When a power-off signal is received by operation of the power-off key 202 of the remote controller 200, the controller 170 of the image display apparatus 100 may control the rollable display 180 to be rolled down as shown in FIG. 13D.

In this case, the controller 170 of the image display apparatus 100 may control a displayed image to be scaled down during rolling down of the display 180 such that a downscaled image 1020 is displayed, as shown in FIG. 13D.

Figure 13E:
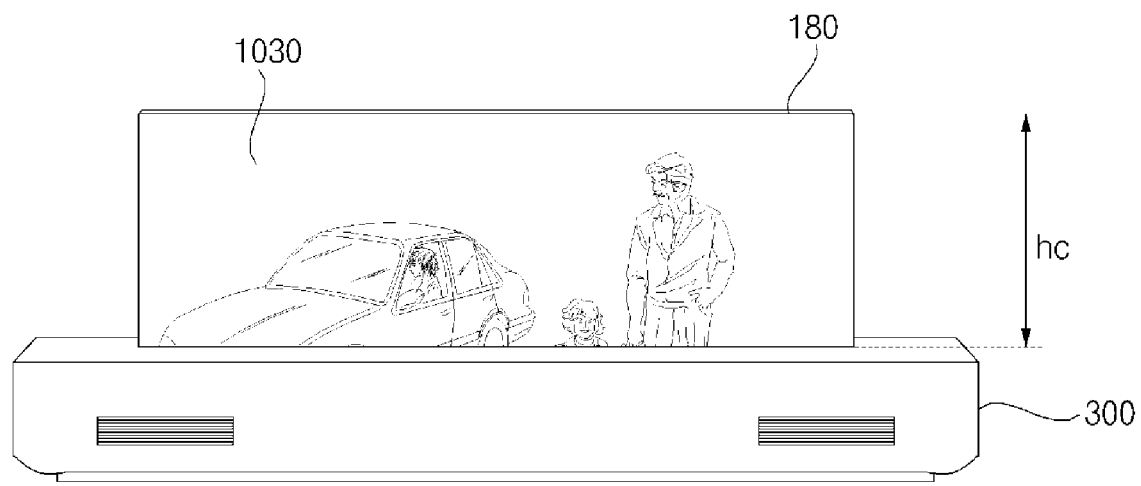

Next, FIG. 13E illustrates that the height of the display 180 becomes hc by rolling down of the display 180.

At this time, the controller 170 of the image display apparatus 100 may perform a control operation to scale down the displayed image to display a downscaled image 1030 as shown in FIG. 13E.

Unlike FIGS. 13D and 13E, when the power-off signal is received by operation of the power-off key 202 of the remote controller 200, the controller 170 of the image display apparatus 100 may control the image not to be displayed during rolling down of the display 180.

Figure 13F:
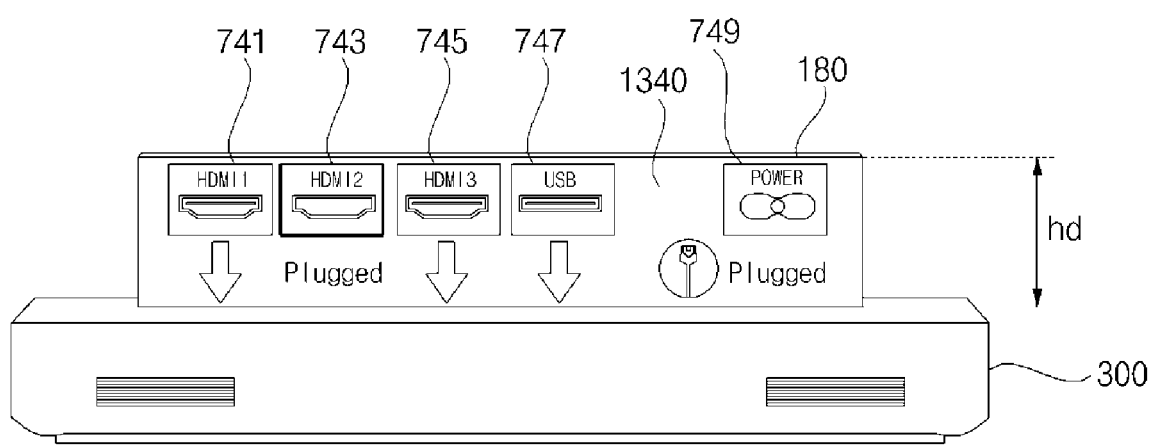

Next, FIG. 13F illustrates that the height of the display 180 becomes a first height hd by rolling down the display 180.

When the height of the display 180 becomes the first height hd by rolling down of the display 180, the controller 170 of the image display apparatus 100 may control a plurality of external input objects 741 to 747 corresponding to the plurality of external input terminals HDMI1 to HDMI3 and USB to be displayed at positions corresponding to the plurality of external input terminals HDMI1 to HDMI3 and USB within the display 180, as shown in FIG. 13F.

Thereby, the user may easily identify the positions of the plurality of external input terminals HDMI1 to HDMI3 and USB disposed on the rear surface of the image display apparatus 100. Accordingly, an external device may be guided so as to be easily detached from an external input terminal disposed on the rear surface of the image display apparatus 100.

Particularly, since the height of the rollable display is reduced, an external device to be detached may be easily guided so as to be detached from an external connection terminal. Therefore, user convenience may be enhanced.

Meanwhile, the controller 170 of the image display apparatus 100 may control an external input object 743 corresponding to a pre-connected external input terminal HDMI2 among a plurality of external input objects 741 to 747 to be displayed so as to be distinguished from the external input objects 741, 745, and 747 corresponding to the unconnected external input terminals HDMI1, HDMI3, and USB, as shown in FIG. 13F.

Thus, the user can easily distinguish the external input terminal connected to the unconnected external input terminal.

When the height of the display becomes a first height hd by rolling down of the display 180, the controller 170 of the image display apparatus 100 may control a power object 749 indicating the power terminal to be displayed at a position corresponding to the power terminal within the display 180, as shown in FIG. 13F. Accordingly, the user may easily detach the power terminal.

The display apparatus according to embodiments of the present invention is not limited to configurations and methods of the embodiments described above. Variations may be made to the embodiments described above by selectively combining all or some of the embodiments.

As is apparent from the above description, according to an embodiment of the present invention, there is provided an image display apparatus including a rollable display, a drive unit to change a size of the display, an external device interface unit including a plurality of external input terminals, and a controller to control the display, wherein, based on an external input display command, the controller controls the drive unit to roll down the display and controls a plurality of external input objects corresponding to the plurality of external input terminals to be displayed at positions corresponding to the plurality of external input terminals within the rolled-down display. Accordingly, an external device may be guided so as to be easily connected to an external input terminal disposed on the rear surface of the image display apparatus.

In particular, since the plurality of external input objects corresponding to the plurality of external input terminals is displayed, the user can immediately identify the position of an external input terminal to be connected. Further, since the height of the rollable display is reduced, an external device to be connected may be easily guided so as to be connected to an external connection terminal. Therefore, user convenience may be enhanced.

When the height of the display is set to a first height by rolling down the display, a power object indicating a power terminal may be controlled to be displayed at a position corresponding to the power terminal within the display. Therefore, the user may easily perform connection to or detachment from the power terminal.

When a first external input terminal item is selected from among a plurality of external input terminal items based on a pointer and there is no external device connected to the first external input terminal, the drive unit may be controlled based an external input display command to roll down the display. Accordingly, the height of the display may be easily reduced.

When a first external input terminal is selected from among the plurality of external input terminals, a first external input object corresponding to the first external input terminal among a plurality of external input objects may be controlled to be highlighted and displayed. Accordingly, the first external input terminal may be immediately identified, and thus user convenience may be enhanced.

If there is no image displayed for a predetermined time, the drive unit may be controlled to roll down the display, and a plurality of external input objects corresponding to the plurality of external input terminals may be controlled to be displayed at positions corresponding to the plurality of external input terminal. Accordingly, connection of an external device may be easily guided and further unnecessary power consumption may be reduced.

When access to a side surface or rear surface of a signal processing device is sensed, the drive unit may be controlled to roll down the display, and a plurality of external input objects corresponding to a plurality of external input terminals may be controlled to be displayed at positions corresponding to the plurality of external input terminals within the rolled-down display. Accordingly, connection of an external device may be easily guided.

When a power-off input is provided during display of a predetermined image, the drive unit may be controlled to roll down the display, and a plurality of external input objects corresponding to a plurality of external input terminals may be controlled to be displayed at positions corresponding to the plurality of external input terminals within the rolled-down display. Accordingly, detachment of an external device may be easily guided.

According to another embodiment of the present invention, there is provided an image display apparatus including a rollable display, a drive unit to change a size of the display, an external device interface unit including a plurality of external input terminals, and a controller to control the display, wherein, when a first external input terminal is selected from among the plurality of external input terminals, the controller controls the drive unit to roll down the display, and controls a first external input object corresponding to the first external input terminal to be displayed at a position corresponding to the first external input terminal. Accordingly, an external device may be guided so as to be easily connected to an external input terminal disposed on the rear surface of the image display apparatus.

In particular, by displaying the first external input object corresponding to the selected first external input terminal, the user may immediately identify the position of the external input terminal to be connected. Further, since the height of the rollable display is reduced, an external terminal to be connected may be easily guided so as to be connected to an external connection terminal. Therefore, user convenience may be enhanced.

According to another embodiment of the present invention, there is provided an image display apparatus including a rollable display, first and second drive units arranged at opposite side ends of the rollable display to change a size of the rollable display, a support disposed at a rear end of the display and arranged between the first and second drive units, a plurality of input terminals disposed on a rear surface of the support, and a controller to control the display, wherein the controller performs a control operation based on an external input display command to move at least one of the opposite side ends of the display toward the support during display of a predetermined image to reduce the size of the display, and controls a plurality of external input objects corresponding to the plurality of external input terminals to be displayed at positions corresponding to the plurality of external input terminals within the display having the reduced size. Accordingly, an external device may be guided so as to be easily connected to an external input terminal disposed on the rear surface of the image display apparatus.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An image display apparatus comprising:
a rollable display;
a drive device to change a size of a viewing area of the display by changing a height of the display, wherein the drive device to roll up the display, and the drive device to roll down the display;
a user input interface to receive a signal from a remote controller;
a processing device having a plurality of external input terminals on a surface of the processing device, wherein the plurality of external input terminals are spaced apart from each other in a row; and
a controller to control the display,
wherein when an external input signal based on an input key of the remote controller is received, the controller is configured to display an external input menu including a plurality of external input terminal items on the display,
wherein when a first external input terminal is not connected to an external device in a state in which the first external input terminal is selected from the plurality of external input terminals, the controller controls the drive device to roll down the display,
wherein the controller controls a plurality of external input objects to be displayed, on the rolled down display, at positions corresponding to the plurality of external input terminals,
wherein the plurality of external input objects displayed on the display are spaced apart from each other in a row.

2. The image display apparatus according to claim 1, wherein the controller controls the display of the plurality of external input objects to be on the display when the height of the display is changed, to a first height.

3. The image display apparatus according to claim 2, wherein, when the height of the display is changed to the first height, the controller controls a power object to be displayed, on the rolled down display, at a position corresponding to a power terminal on the surface of the processing device.

4. The image display apparatus according to claim 1, wherein the controller controls display of a pointer on the display based on movement of the remote controller,
wherein when the first external input terminal item is selected, based on the pointer, from the displayed plurality of external input terminal items and the first external input terminal is not connected to an external device, the controller controls the drive device to roll down the display, based on the external input display command.

5. The image display apparatus according to claim 1, wherein, while the drive device is rolling down the display, the controller scales down the image and controls the scaled-down image to be displayed on the rolled down display.

6. The image display apparatus according to claim 1, wherein when a first external input terminal is selected from the plurality of external input terminals, the controller controls a first external input object, corresponding to the first external input terminal, to be highlighted while being displayed.

7. The image display apparatus according to claim 1, wherein the controller controls an external input object, corresponding to a connected one of the external input terminals, to be displayed so as to be distinguished from other ones of the displayed external input objects corresponding to unconnected ones of the external input terminals.

8. The image display apparatus according to claim 1, wherein when the display has a specific height and no image is displayed on the display for a predetermined time, the controller controls the drive device to roll down the display, and controls the plurality of external input objects to be displayed, on the rolled down display, at positions corresponding to the plurality of external input terminals.

9. The image display apparatus according to claim 8, wherein the controller controls an external input object, corresponding to a connected one of the external input terminals, to be displayed so as to be distinguished from other ones of the displayed external input objects corresponding to unconnected ones of the external input terminals.

10. The image display apparatus according to claim 2, further comprising:
a sensor to sense movement at the processing device,
wherein in response to the sensed movement at the processing device, the controller controls the drive device to roll down the display, and controls the plurality of external input objects to be displayed, on the rolled down display, at positions corresponding to the plurality of external input terminals.

11. The image display apparatus according to claim 1, wherein when a power-off input is received during display of a predetermined image, the controller controls the drive device to roll down the display, and controls the plurality of external input objects to be displayed, on the rolled down display, at positions corresponding to the plurality of external input terminals.

12. The image display apparatus according to claim 11, wherein the controller controls an external input object corresponding to a connected one of the external input terminals to be displayed so as to be distinguished from other ones of the displayed external input objects corresponding to unconnected ones of the external input terminals.

13. An image display apparatus comprising:
a rollable display;
a drive device to change a size of a viewing area of the display by changing a height of the display, wherein the drive device to roll up the display, and the drive device to roll down the display;
a processing device having a plurality of external input terminals on a surface of the processing device, wherein the plurality of external input terminals are spaced apart from each other in a row; and
a controller to control the display,
wherein, when a first external input terminal is selected from the plurality of external input terminals, the controller controls the drive device to roll down the display, and controls a first external input object, corresponding the first external input terminal to be displayed, on the rolled down display, at a position corresponding to the first external input terminal,
wherein the plurality of external input terminals includes a plurality of HDMI terminals and a USB terminal.

14. The image display apparatus according to claim 13, wherein the controller controls the display of the first external input object when the height of the display is changed to a first height.

15. An image display apparatus comprising:
a rollable display;
first and second drive devices arranged to control opposite ends of the rollable display and change a size of a viewing area of the rollable display;
a support disposed at a rear of the display and provided between the first and second drive devices, wherein the support includes a plurality of external input terminals disposed on a surface of the support, wherein the plurality of external input terminals are spaced apart from each other in a row; and
a controller to control the display,
wherein based on an external input display command, the controller controls movement of at least a first one of the ends of the display toward the support during display of a predetermined image to reduce the size of the viewing area of the display, and controls a plurality of external input objects to be displayed on the display at positions corresponding to the plurality of external input terminals,
wherein the plurality of external input objects are spaced apart from each other in a row,
wherein the plurality of external input terminals includes a plurality of HDMI terminals and a USB terminal.

16. The image display apparatus according to claim 15, comprising:
a user input interface to receive a signal from a remote controller,
wherein when an external input signal is received, at the user input interface, based on an input key of the remote controller, the controller controls an external input menu to be displayed on the display, the external input menu including a plurality of external input terminal items,
wherein when a first external input terminal item is selected from the plurality of external input terminal items, the controller controls at least one of the ends of the display to be moved toward the support to reduce the size of the viewing area of the display.

17. The image display apparatus according to claim 15, wherein when a first external input terminal is selected from the plurality of external input terminals, the controller controls a first external input object corresponding to the first external input terminal, to be highlighted while being displayed.

18. The image display apparatus according to claim 15, wherein the controller controls an external input object, corresponding to a connected one of the external input terminals, to be displayed so as to be distinguished from the displayed external input objects corresponding to unconnected ones of the external input terminals.

* * * * *